US010042450B2

(12) United States Patent
Han et al.

(10) Patent No.: US 10,042,450 B2
(45) Date of Patent: Aug. 7, 2018

(54) TOUCH SENSOR INTEGRATED TYPE DISPLAY DEVICE CAPABLE OF ACHIEVING UNIFORM TOUCH ACCURACY

(71) Applicant: LG Display Co., Ltd., Seoul (KR)

(72) Inventors: Manhyeop Han, Seoul (KR); Juhan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 14/548,569

(22) Filed: Nov. 20, 2014

(65) Prior Publication Data

US 2015/0185940 A1 Jul. 2, 2015

(30) Foreign Application Priority Data

Dec. 30, 2013 (KR) .................. 10-2013-0166700

(51) Int. Cl.
G06F 3/041 (2006.01)
G06F 3/044 (2006.01)

(52) U.S. Cl.
CPC ............ G06F 3/0412 (2013.01); G06F 3/044 (2013.01)

(58) Field of Classification Search
CPC ...... G06F 3/0416; G06F 3/0412; G06F 3/044; G06F 2203/04103; G06F 2203/04104; G06F 2203/04111; G02F 1/13338; G02F 1/133345; G02F 1/133512; G02F 1/133514; G02F 1/133528; G02F 1/1337; G02F 1/134309; G02F 1/134363; G02F 1/136286; G02F 1/1368; G02F 2001/133742;

(Continued)

(56) References Cited

U.S. PATENT DOCUMENTS 8,890,830 B2 * 11/2014 Choi .................. G06F 3/041
345/156
2009/0066670 A1 * 3/2009 Hotelling ............. G06F 3/0416
345/174

(Continued)

FOREIGN PATENT DOCUMENTS

CN 1942853 A 4/2007
CN 101825966 A 9/2010

(Continued)

OTHER PUBLICATIONS

English language translation of KR20110029470; Author: Park et al. Published: Mar. 23, 2011.*

(Continued)

*Primary Examiner* — Nalini Mummalaneni
(74) *Attorney, Agent, or Firm* — Morgan, Lewis & Bockius LLP

(57) ABSTRACT

A touch sensor integrated type display device includes first touch electrodes located in the active area and divided in first and second directions crossing each other; second touch electrodes located in the active area, divided in the first direction, and alternating with the first touch electrodes arranged in the first direction; and a plurality of first sub routing wires respectively connected to the plurality of first touch electrodes, and arranged side by side in the second direction, wherein the first touch electrodes located in outermost both sides of the active area in the first direction, among the first touch electrodes arranged in the second direction, are smaller in size than another first touch electrodes.

3 Claims, 16 Drawing Sheets

(58) Field of Classification Search
CPC .......... G02F 2001/134372; G09G 2300/0809; G09G 2320/0646; G09G 3/3677; G09G 3/3688; G09G 3/3696
See application file for complete search history.

(56) References Cited

U.S. PATENT DOCUMENTS

| | | | |
|---|---|---|---|
| 2010/0110041 A1* | 5/2010 | Jang | G06F 3/0412 345/174 |
| 2010/0194697 A1 | 8/2010 | Hotelling et al. | |
| 2013/0241868 A1* | 9/2013 | Kim | G09G 3/3685 345/174 |
| 2014/0347319 A1 | 11/2014 | Lin et al. | |
| 2015/0084888 A1* | 3/2015 | Han | G06F 3/0412 345/173 |
| 2015/0185903 A1* | 7/2015 | Park | G06F 3/044 345/173 |

FOREIGN PATENT DOCUMENTS

| | | | | |
|---|---|---|---|---|
| EP | 2431847 A1 * | 3/2012 | ......... | G02F 1/13338 |
| KR | 20110029470 A * | 3/2011 | ............. | G06F 3/044 |
| TW | M472240 U | 2/2014 | | |
| TW | 201445408 A | 12/2014 | | |

OTHER PUBLICATIONS

Taiwanese Office Action for Taiwanese Patent Application No. 103137845, dated Mar. 21, 2016.
The First Office Action dated May 24, 2017 from The State Intellectual Property Office of the People's Republic of China in counterpart Chinese application No. 201410743792.1.

* cited by examiner

TOUCH SENSOR INTEGRATED TYPE DISPLAY DEVICE CAPABLE OF ACHIEVING UNIFORM TOUCH ACCURACY

This application claims the benefit of priority under 35 U.S.C. § 119(a) to Korean Patent Application No. 10-2013-0166700 filed on Dec. 30, 2013, which is incorporated by reference herein in its entirety.

BACKGROUND OF THE INVENTION

Field of the Invention

This document relates to a touch sensor integrated type display device which is capable of recognizing a user's touch.

Discussion of the Related Art

Recently, various input devices such as a keyboard, a mouse, a trackball, a joystick, and a digitizer have been used to configure an interface between users and home appliances or various kinds of information communication equipment. However, such input devices as a keyboard, a mouse, etc require the user to learn to use them and take up space. Therefore, the demand for input devices that are convenient and easy to use and reduce erroneous operations is growing more and more. In response to this demand, a touch sensor for enabling a user to input information by directly touching the screen with their hand or a pen was suggested.

The touch sensor is simple to use, has less malfunctions, and enables the user to input without using an additional input device. In addition, the touch sensor can be applied to various display devices because it enables the user to operate it quickly and easily through content displayed on the screen.

Touch sensors can be classified into add-on type and on-cell type. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device.

However, the add-on type sensor has a structure in which the completed touch panel is mounted on the display device and has various problems, such as increased thickness or reduced visibility due to low brightness of the display device.

In addition, the on-cell type touch sensor has a structure in which a touch panel is formed on the upper surface of the display device and can have a reduced thickness compared to the add-on type but still has the problem of the increase in entire thickness due to a driving electrode layer, a sensing electrode layer, and an insulation layer for insulating the driving electrode layer and the sensing electrode layer, which constitute the touch sensor. As such, the number of processes and the manufacturing cost in the on-cell type touch sensor increase.

Accordingly, the need for a display device capable of solving the related art problems has arisen.

Hereinafter, a related art touch sensor integrated type display device will be described with reference to FIGS. 1A and 1B. FIG. 1A is a top plan view of a related art touch sensor integrated type display device. FIG. 1B is a cross-sectional view taken along the line I-I' of FIG. 1A.

With reference to FIGS. 1A and 1B, a touch sensor integrated type display device comprises an active area AA where touch electrodes are formed and data is displayed and a bezel area AA which is located outside the active area AA and where wires connecting touch electrodes to constitute touch electrode lines are formed.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW14, TW21 to TW24, TW31 to TW34, and TW41 to TW44 connected to the plurality of first touch electrodes Tx11 to Tx14, Tx21 to Tx24, Tx31 to Tx34, and Tx41 to Tx44, respectively, and extending in the second direction, and a plurality of second touch electrodes Rx1 to Rx3 located between first touch electrodes neighboring in the first direction and arranged in the second direction.

The plurality of first touch electrodes Tx11 to Tx14, Tx21 to Tx24, Tx31 to Tx34, and Tx41 to Tx44 are connected to each other by the first sub routing wires TW11 to TW14, TW21 to TW24, TW31 to TW34, and TW41 to TW44 respectively connected to the first touch electrodes Tx11 to Tx14, Tx21 to Tx24, Tx31 to Tx34, and Tx41 to Tx44, first connecting wires TW1c to TW4c, and first main routing wires TW1 to TW4 to constitute a plurality of first touch electrode lines Tx1 to Tx4 arranged in the first direction.

Specifically, the first row of 1-1 touch electrodes Tx11 to Tx14 arranged in the first direction (along the x axis) are connected to each other by the 1-1 sub routing wires TW11 to TW14 respectively connected to the 1-1 touch electrodes Tx11 to Tx14, the 1-1 connecting wire TW1c connecting the 1-1 sub routing wires TW11 to TW14, and the 1-1 main routing wire TW1 connected to the 1-1 connecting wire TW1c to constitute a 1-1 touch electrode line Tx1 for the first row.

The second row of 1-2 touch electrodes Tx21 to Tx24 arranged in the first direction (along the x axis) are connected to each other by the 1-2 sub routing wires TW21 to TW24 respectively connected to the 1-2 touch electrodes Tx21 to Tx24, the 1-2 connecting wire TW2c connecting the 1-2 sub routing wires TW21 to TW24, and the 1-2 main routing wire TW2 connected to the 1-2 connecting wire TW2c to constitute a 1-2 touch electrode line Tx2 for the second row.

The third row of 1-3 touch electrodes Tx31 to Tx34 arranged in the first direction (along the x axis) are connected to each other by the 1-3 sub routing wires TW31 to TW34 respectively connected to the 1-3 touch electrodes Tx31 to Tx34, the 1-3 connecting wire TW3c connecting the 1-3 sub routing wires TW31 to TW34, and the 1-3 main routing wire TW3 connected to the 1-3 connecting wire TW3c to constitute a 1-3 touch electrode line Tx3 for the third row.

The fourth row of 1-4 touch electrodes Tx41 to Tx44 arranged in the first direction (along the x axis) are connected to each other by the 1-4 sub routing wires TW41 to TW44 respectively connected to the 1-4 touch electrodes Tx41 to Tx44, the 1-4 connecting wire TW4c connecting the 1-4 sub routing wires TW41 to TW44, and the 1-4 main routing wire TW4 connected to the 1-4 connecting wire TW4c to constitute a 1-4 touch electrode line Tx4 for the fourth row.

The 2-1 touch electrode Rx1 is located between the first touch electrodes Tx11, Tx21, Tx31, and Tx41 in the first column and the first touch electrodes Tx12, Tx22, Tx32, and Tx42 in the second column, which neighbor in the first direction, to constitute a 2-1 touch electrode line Rx1 for the first column.

The 2-2 touch electrode Rx2 is located between the first touch electrodes Tx12, Tx22, Tx32, and Tx42 in the second column and the first touch electrodes Tx13, Tx23, Tx33, and Tx43 in the third column, which neighbor in the first direction, to constitute a 2-2 touch electrode line Rx2 for the second column.

The 2-3 touch electrode Rx3 is located between the first touch electrodes Tx13, Tx23, Tx33, and Tx43 in the third column and the first touch electrodes Tx14, Tx24, Tx34, and Tx44 in the fourth column, which neighbor in the first direction, to constitute a 2-3 touch electrode line Rx3 for the third column.

The bezel area BA is located outside the active area AA, and comprises various wires and pads. The wires comprise touch wires TW11 to TW14, TW21 to TW24, TW31 to TW34, TW41 to TW44, TW1c to TW4c, TW1 to TW4; and RW1 to RW3 connected to the first and second touch electrodes Tx11 to Tx14, Tx21 to Tx24, Tx31 to Tx34, Tx41 to Tx44; and Rx1 to Rx3, gate wires (not shown) connected to a gate driving circuit, and data wires (not shown) connected to a data driving circuit. The pads comprise touch pads TP1 to TP4 and RP1 to RP3 connected to the touch wires.

The first and second touch electrodes Tx11 to Tx14, Tx21 to Tx24, Tx31 to Tx34, Tx41 to Tx44, and Rx1 to Rx3 within the active area AA are divided from the common electrodes of the display device. They operate as common electrodes during a display driving operation for displaying data and as touch electrodes during a touch driving operation for recognizing a touch position.

The above-described touch sensor integrated type display device has the advantage of reducing the number of processes for forming a touch sensor element and making thin products because common electrodes also function as touch driving electrodes or touch sensing electrodes of a touch sensor. Also, it has the advantage of not needing to increase the left and right sides of the bezel area BA because the first sub routing wires TW11 to TW14, TW21 to TW24, TW31 to TW34, and TW41 to TW44 for connecting the first touch electrodes Tx11 to Tx14, Tx21 to Tx24, Tx31 to Tx34, and Tx41 to Tx44 extend to the bottom side of the bezel area BA in parallel with the second touch electrodes Rx1 to Rx3 and the four to first touch electrode lines Tx1 to Tx4 are formed by the first connecting wires TW1c to TW4c formed on the bottom side of the bezel area BA.

In the above-described related art touch sensor integrated type display device, all of the first touch electrodes are the same size. The second touch electrodes Rx1 and Rx2 in the first and second columns are positioned on either side of the first touch electrodes Tx12, Tx22, Tx32, and Tx42 in the second column in the middle of the active area AA, and the second touch electrodes Rx2 and Rx3 in the second and third columns are positioned on either side of the first touch electrodes Tx13, Tx23, Tx33, and Tx43 in the third column in the middle of the active area AA. On the other hand, the second touch electrode Rx1 in the first column is positioned on only one side of the first touch electrodes Tx11, Tx21, Tx31, and Tx41 in the first column situated at either end, i.e., left end, of the active area AA, and the second touch electrode Rx3 in the third column is positioned only one side of the first touch electrodes Tx14, Tx24, Tx34, and Tx44 in the fourth column situated at either end, i.e., right end, of the active area AA. Accordingly, the left and right halves of the first touch electrodes Tx12, Tx22, Tx32, and Tx42 in the second column with two second touch electrodes on either side are respectively sensed by the second touch electrodes Rx1 and Rx2 in the first and second columns, and the left and right halves of the first touch electrodes Tx13, Tx23, Tx33, and Tx43 in the third column with two second touch electrodes on either side are respectively sensed by the second touch electrodes Rx2 and Rx3 in the second and third columns; whereas the entire area of the first touch electrodes Tx11, Tx21, Tx31, and Tx41 in the first column with only one second touch electrode on either side and situated at either end of the active area AA is sensed by the second touch electrode Rx1 in the first column and the entire area of the first touch electrodes Tx14, Tx24, Tx34, and Tx44 in the fourth column with only one second touch electrode on either side and situated at either end of the active area AA is sensed by the second touch electrode Rx in the third column. Accordingly, the region of the first touch electrodes sensed by the second touch electrodes is different on the edges and middle of the active area, thereby causing touch accuracy deterioration.

SUMMARY OF THE INVENTION

Accordingly, the present invention is directed to a touch sensor integrated type display device that substantially obviates one or more of the problems due to limitations and disadvantages of the related art.

An object of the present invention is to provide a touch sensor integrated type display device which can achieve uniform touch accuracy no matter where the edges and middle of an active area are.

Another object of the present invention is to provide a touch sensor integrated type display device which can solve the problem of lack of sub routing wires connected to first touch electrodes in the outermost portion and improve the touch channel load problem caused by size expansion by adjusting the position of a main routing wire.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantaged and in accordance with the purpose of the present invention, as embodied and broadly described, a touch sensor integrated type display device, which has an active area and a bezel area located outside the active area, comprises a plurality of first touch electrodes located in the active area and divided in first and second directions crossing each other; a plurality of second touch electrodes located in the active area, divided in the first direction, and alternating with the first touch electrodes arranged in the first direction; and a plurality of first sub routing wires respectively connected to the plurality of first touch electrodes, and arranged side by side in the second direction, wherein the first touch electrodes located in outermost both sides of the active area in the first direction, among the first touch electrodes arranged in the second direction, are smaller in size than another first touch electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1A:
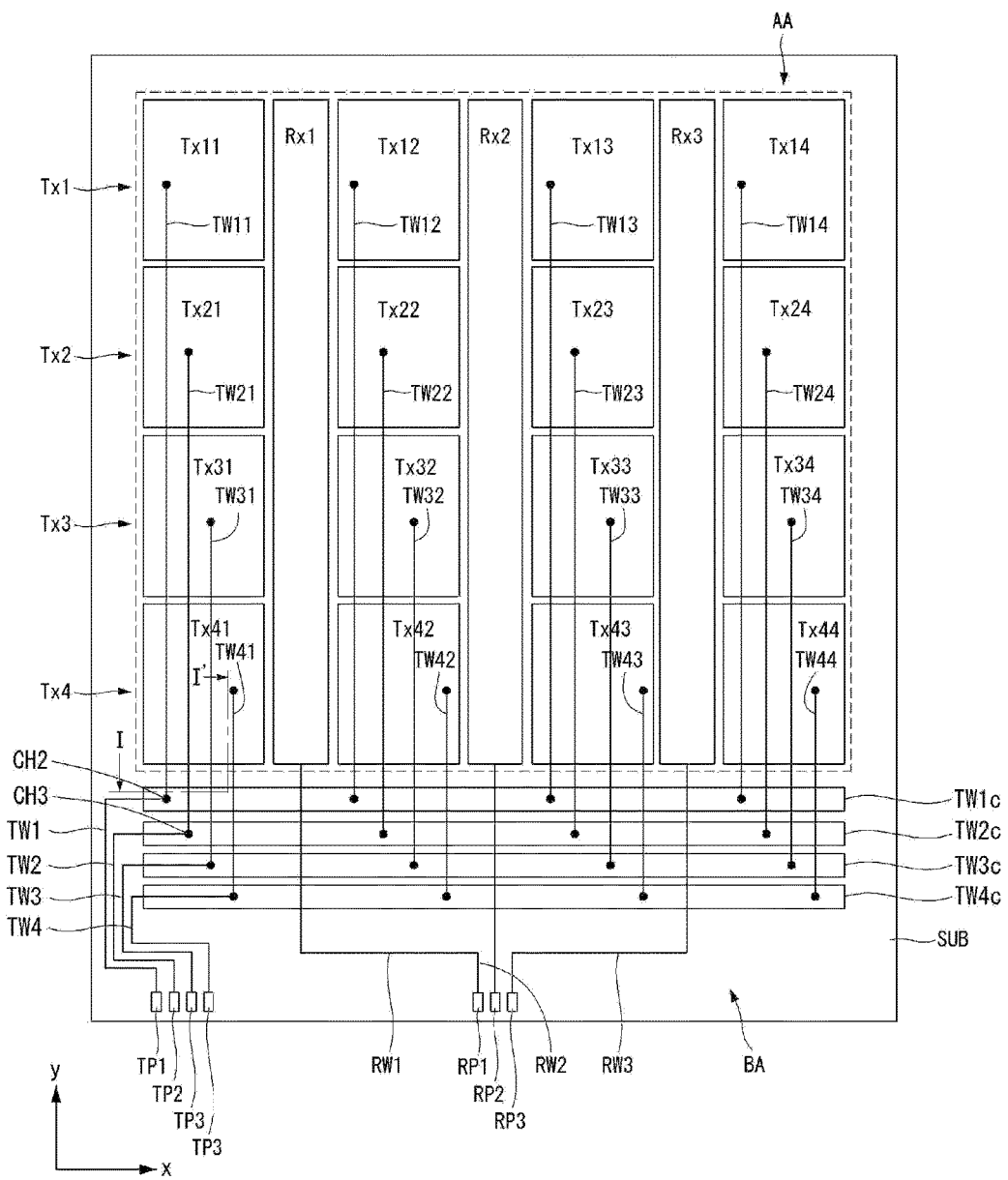
FIG. 1A is a top plan view of a related art touch sensor integrated type display device.
Figure 1B:
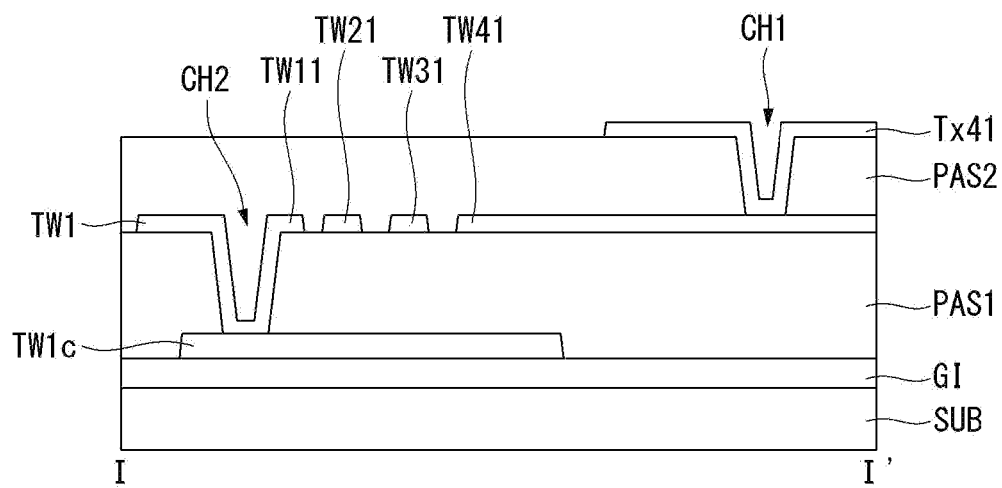
FIG. 1B is a cross-sectional view taken along the line I-I' of FIG. 1A.
Figure 2:
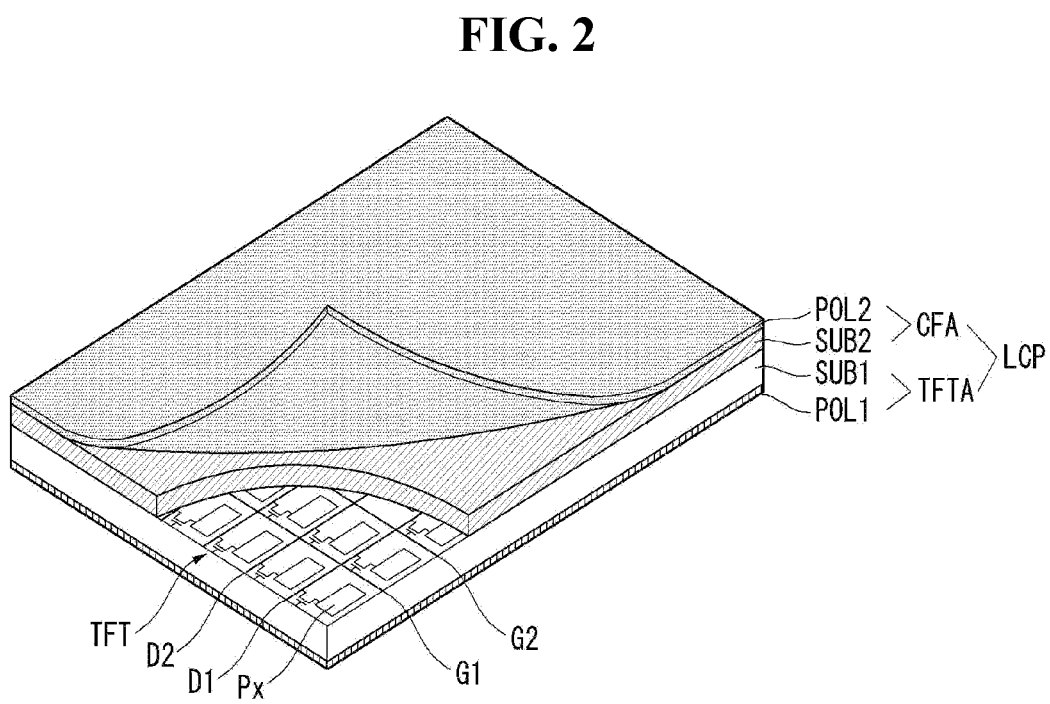
FIG. 2 is a partial exploded perspective view schematically showing a touch sensor integrated type display device according to exemplary embodiments of the present invention.

Hereinafter, exemplary embodiments of this invention will be described in detail with reference to the accompanying drawings, wherein same reference numerals may be used to denote the same or substantially the same elements throughout the specification and the drawings. In what follows, a touch sensor integrated type display device will be described in detail by taking a touch sensor integrated type liquid crystal display device as an example. In the descriptions associated with embodiments described below, FIG. 2 is applicable to all of the embodiments, and general components (e.g., thin film transistors, pixel electrodes, and other various wires for driving a liquid crystal display device) of a liquid crystal display device are omitted in FIGS. 3A to 9B for simplicity of the drawings and convenience of explanation. Accordingly, it is to be understood that well-known components of a liquid crystal display device are included in the present invention.

Figure 3A:
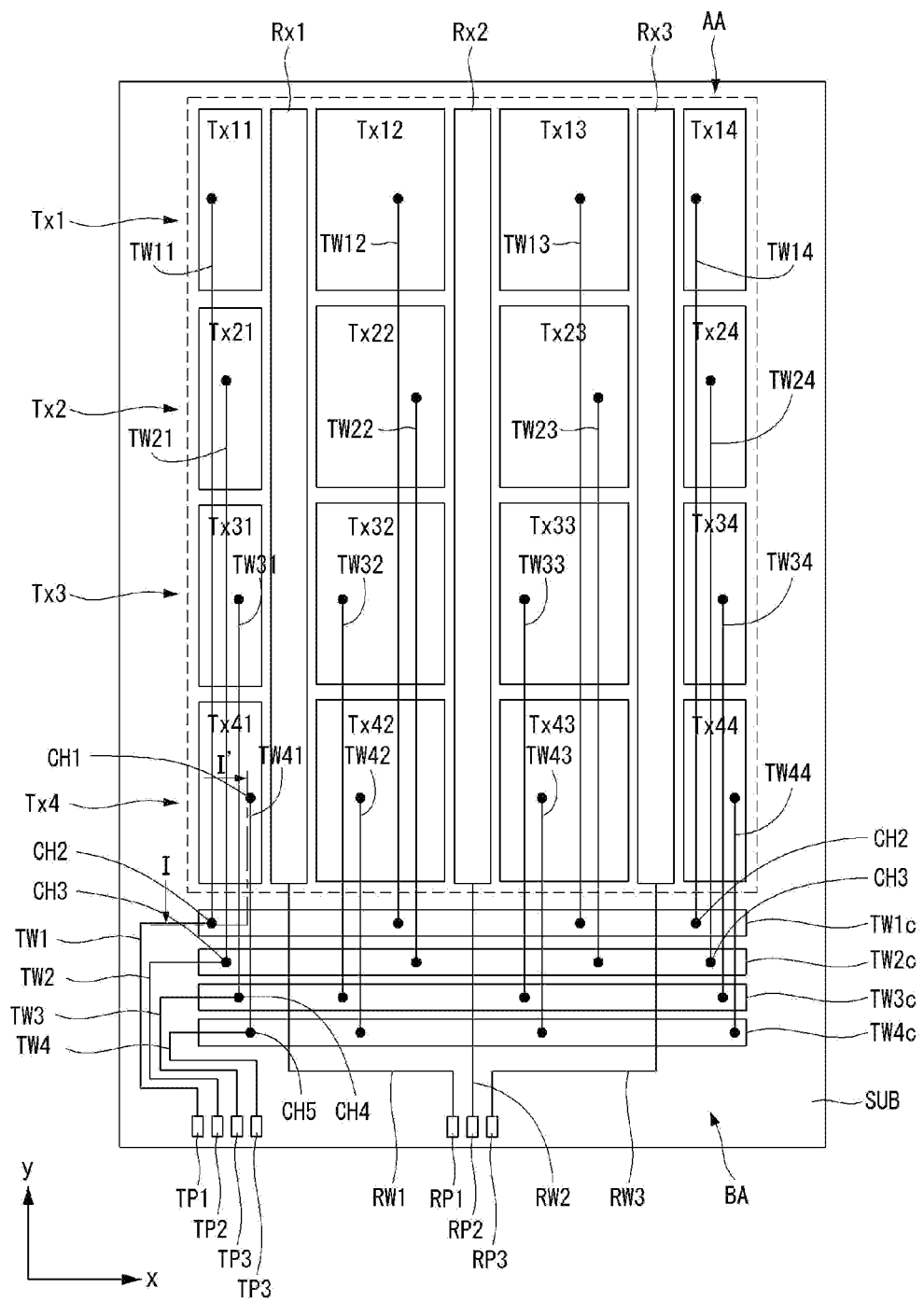
FIG. 3A is a top plan view of a touch sensor integrated type display device according to a first exemplary embodiment of the present invention.
Figure 3B:
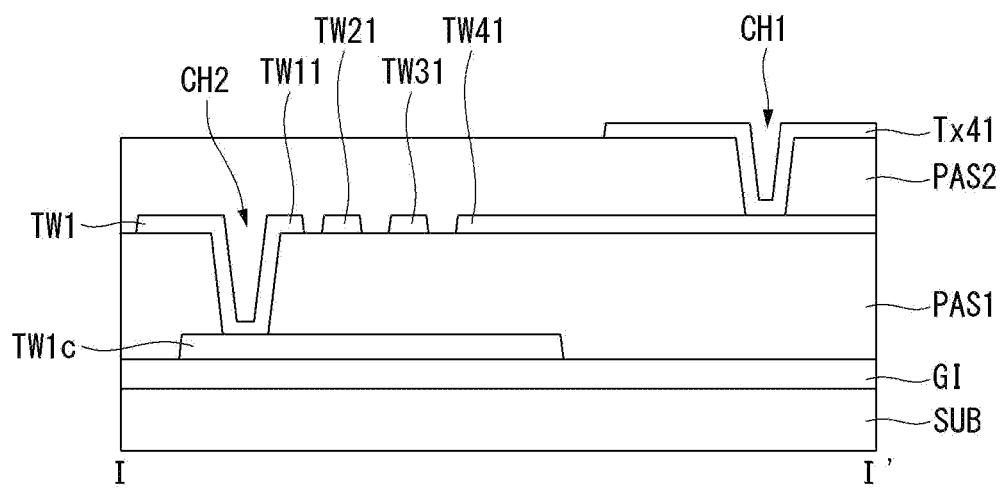
FIG. 3B is a cross-sectional view taken along the line II-II' of FIG. 3A.

First of all, a touch sensor integrated type display device according to a first exemplary embodiment of the present invention will be described with reference to FIG. 2 and FIGS. 3A and 3B. FIG. 2 is a partial exploded perspective view schematically showing a touch sensor integrated type display device according to exemplary embodiments of the present invention. FIG. 3A is a top plan view of a touch sensor integrated type display device according to a first exemplary embodiment of the present invention. FIG. 3B is a cross-sectional view taken along the line II-II' of FIG. 3A.

Referring to FIG. 2, a touch sensor integrated type display device according to exemplary embodiments of the present invention comprises a liquid crystal display panel LCP including a color filter array CFA and a thin film transistor array TFTA with a liquid crystal layer (not shown) interposed therebetween.

The thin film transistor array TFTA comprises a plurality of gate lines G1 and G2 which are formed in parallel on a first substrate SUB1 in a first direction (for example, x-axis direction), a plurality of data lines D1 and D2 which are formed in parallel in a second direction (for example, y-axis direction) to cross over the plurality of gate lines G1 and G2, thin film transistors TFT formed at the crossings of the gate lines G1 and G2 and the data lines D1 and D2, a plurality of pixel electrodes Px for charging a data voltage to liquid crystal cells, and common electrodes (not shown) disposed to face the plurality of pixel electrodes Px.

The color filter array CFA comprises a black matrix and color filters (not shown) formed on a second substrate SUB2. Polarizing plates POL1 and POL2 are respectively connected to outer surfaces of the first substrate SUB1 and second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the first substrate SUBS1 and second substrate SUBS2 of the liquid crystal display panel LCP to maintain cell gaps of the liquid crystal cells.

The common electrodes are formed on the second substrate SUB2 in a vertical electric field driving manner such as a twisted nematic (TN) mode and a vertical alignment (VA) mode. On the other hand, the common electrodes COM are formed on the first substrate SUB1 along with the pixel electrodes Px in a horizontal electric field driving manner such as an in-plane switching (IPS) mode and a fringe field switching (FFS) mode. In the exemplary embodiment of the invention, the common electrodes COM in the horizontal electric field driving manner are described as an example.

Referring to FIGS. 3A and 3B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 3A and 3B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW14, TW21 to TW24, TW31 to TW34, and TW41 to TW44 connected to the plurality of first touch electrodes Tx11 to Tx14, Tx21 to Tx24, Tx31 to Tx34, and Tx41 to Tx44, respectively, and extending in the second direction, and a plurality of second touch electrodes Rx1 to Rx3 located between first touch electrodes neighboring in the first direction and arranged in the second direction.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

The first touch electrodes Tx11 to Tx14, Tx21 to Tx24, Tx31 to Tx34, and Tx41 to Tx44 are connected to the first sub routing wires TW11 to TW14, TW21 to TW24, TW31 to TW34, and TW41 to TW44, respectively. The first sub routing wires TW11 to TW14, TW21 to TW24, TW31 to TW34, and TW41 to TW44 are located between the pixel electrodes (not shown) formed on the first passivation layer PAS1. The first touch electrodes Tx11 to Tx14, Tx21 to Tx24, Tx31 to Tx34, and Tx41 to Tx44 are connected to the first sub routing wires TW11 to TW14, TW21 to TW24, TW31 to TW34, and TW41 to TW44 exposed via first contact holes CH1 formed in the second passivation layer PAS2, respectively.

The first sub routing wires TW11 to TW14, TW21 to TW24, TW31 to TW34, and TW41 to TW44 are connected together by first connecting wires TW1c to TW4c and first main routing wires TW1 to TW3 formed in the bezel area to constitute a plurality of first touch electrode lines Tx1 to Tx4 arranged in the first direction. The first connecting wires TW1c to TW4c are formed on the same layer as a source/drain electrode layer (not shown) of the thin film transistors and arranged in the first direction (along the x axis). Hereinafter, the embodiment of the present invention will be described taking as an example a gate bottom structure in which the first connecting wires TW1c to TW4c are formed on the gate insulation layer GI covering gate electrodes of the thin film transistors.

The first touch electrode lines Tx1 to Tx4 are configured as follows. The 1-1 touch electrodes Tx11 to Tx14 in the first row arranged in the first direction (along the x axis) are connected to each other by the 1-1 sub routing wires TW11 to TW14 connected to the 1-1 touch electrodes Tx11 to TX14 via first contact holes CH1, the 1-1 connecting wire TW1c formed in the bezel area BA to connect the 1-1 sub routing wires TW11 to TW14, and the 1-1 main routing wire TW1 connected to the 1-1 connecting wire TW1c to constitute the 1-touch electrode line Tx1 in the first row. The 1-1 connecting wire TW1c is connected to the 1-1 sub routing wires TW11, TW12, TW13, and TW14 formed on the first passivation layer PAS1 via second contact holes CH2 formed in the gate insulation layer GI.

The 1-2 touch electrodes Tx21 to Tx24 in the second row arranged in the first direction (along the x axis) are connected to each other by the 1-2 sub routing wires TW21 to TW24 connected to the 1-2 touch electrodes Tx21 to TX24 via first contact holes CH1, the 1-2 connecting wire TW2c formed in the bezel area BA to connect the 1-2 sub routing wires TW21 to TW24, and the 1-2 main routing wire TW2 connected to the 1-2 connecting wire TW2c to constitute the 1-2 touch electrode line Tx2 in the second row. The 1-2 connecting wire TW2c is connected to the 1-2 sub routing wires TW21, TW22, TW23, and TW24 formed on the first passivation layer PAS1 via third contact holes CH3 formed in the gate insulation layer GI.

The 1-3 touch electrodes Tx31 to Tx34 in the third row arranged in the first direction (along the x axis) are connected to each other by the 1-3 sub routing wires TW31 to TW34 connected to the 1-3 touch electrodes Tx21 to TX24 via first contact holes CH1, the 1-3 connecting wire TW3c formed in the bezel area BA to connect the 1-3 sub routing wires TW31 to TW34, and the 1-3 main routing wire TW3 connected to the 1-3 connecting wire TW3c to constitute the 1-3 touch electrode line Tx3 in the third row. The 1-3 connecting wire TW3c is connected to the 1-3 sub routing wires TW31, TW32, TW33, and TW34 formed on the first passivation layer PAS1 via fourth contact holes CH4 formed in the gate insulation layer GI.

The 1-4 touch electrodes Tx41 to Tx44 in the fourth row arranged in the first direction (along the x axis) are connected to each other by the 1-4 sub routing wires TW41 to TW44 connected to the 1-4 touch electrodes Tx41 to TX44 via first contact holes CH1, the 1-4 connecting wire TW4c formed in the bezel area BA to connect the 1-4 sub routing wires TW41 to TW44, and the 1-4 main routing wire TW4 connected to the 1-4 connecting wire TW4c to constitute the 1-4 touch electrode line Tx4 in the fourth row. The 1-4 connecting wire TW4c is connected to the 1-4 sub routing wires TW41, TW42, TW43, and TW44 formed on the first passivation layer PAS1 via fifth contact holes CH5 formed in the gate insulation layer GI.

The second touch electrodes Rx1 to Rx3 are connected to second routing wires RW1 to RW3 formed in the bezel area BA, respectively, to constitute a plurality of second touch electrode lines. The second touch electrodes Rx1 to Rx 3 are formed on the second passivation layer PAS2 like the first touch electrodes, and the second routing wires RW1 to RX3 are formed on the first passivation layer PAS1 and connected to the second touch electrodes Rx1 to Rx3, respectively, via contact holes (not shown) formed in the second passivation layer PAS2.

The 2-1 touch electrode Rx1 in the first column is located between the first touch electrodes Tx11, Tx21, Tx31, and Tx41 in the first column and the first touch electrodes Tx12, Tx22, Tx32, and Tx42 in the second column, which neighbor each other in the first direction, and connected to the 2-1 routing wire RW1 to constitute the 2-1 touch electrode line in the first column.

The 2-2 touch electrode Rx2 is located between the first touch electrodes Tx12, Tx22, Tx32, and Tx42 in the second column and the first touch electrodes Tx13, Tx23, Tx33, and Tx43 in the third column, which neighbor each other in the first direction, and connected to the 2-2 routing wire RW2 to constitute the 2-2 touch electrode line in the second column.

The 2-3 touch electrode Rx3 is located between the first touch electrodes Tx13, Tx23, Tx33, and Tx43 in the third column and the first touch electrodes Tx14, Tx24, Tx34, and Tx44 in the fourth column, which neighbor each other in the first direction, and connected to the 2-3 routing wire RW3 to constitute the 2-3 touch electrode line in the third column.

The bezel area BA is located outside the active area AA, and comprises various wires and pads. The wires comprise touch wires TW11 to TW14, TW21 to TW24, TW31 to TW34, TW41 to TW44, TW1c to TW4c, TW1 to TW4; and RW1 to RW3 connected to the first and second touch electrodes Tx11 to Tx14, Tx21 to Tx24, Tx31 to Tx34, Tx41 to Tx44; and Rx1 to Rx3, gate wires (not shown) connected to a gate driving circuit, and data wires (not shown) connected to a data driving circuit. The pads comprise first touch pads TP1 to TP4 connected to the first main routing wires TW1 to TW4 of the first touch wires and second touch pads RP1 to RP3 connected to the second touch wires RW1 to RW3.

Among the touch wires formed in the bezel area BA, the first connecting wires TW1c to TW4c are formed on the gate insulation layer GI, and connected to the first sub routing wires TW11 to TW14, TW21 to TW24, TW31 to TW34, TW41 to TW44, respectively, via the second to fifth contact holes CH2 to CH5 formed in the first passivation layer PAS1. The first main routing wires TW1 to TW4 are formed on the first passivation layer PAS1, and extend from the 1-1 sub routing wires TW11, Tw21, TW31, and Tw41, respectively.

The first and second touch electrodes Tx11 to Tx14, Tx21 to Tx24, Tx31 to Tx34, TX41 to Tx44; and Rx to Rx3 within the active area AA are divided from the common electrodes of the display device. They operate as common electrodes during a display driving operation for displaying data and as touch electrodes during a touch driving operation for recognizing a touch position.

According to the touch sensor integrated display device according to the first exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, the area of the first touch electrodes sensed by the second touch electrodes is equal on both the edges and middle of the active area AA, thereby improving touch accuracy compared with the related art touch sensor integrated type display device.

According to the touch sensor integrated type display device according to the first exemplary embodiment of the present invention, however, if the number of channels for touch driving and sensing operations increases due to an increase in the panel size of the display device, the first touch electrodes located in the outermost part along the column direction are narrower in width than the first touch electrodes in the other columns. For example, if the first electrodes located in the outermost part are smaller in size than the first touch electrodes in the other columns, the configuration space of the first sub routing wires extending to the first connecting wires to connect with the first connecting wires formed in the bezel area is narrowed and some of the first touch electrodes located in the outermost part therefore cannot be connected to the first sub routing wires, thereby making it difficult to configure a touch sensor. That is, an increase in the number of touch channels may cause lack of the number of sub routing wires which are to connect with the first connecting wires connected to the main routing wires, on the first electrodes in the outermost part. This problem is basically due to an increase in screen size.

Moreover, the increase in screen size results in a load increase because the first connecting wires and main routing wires formed in the bezel area are lengthened, and produces parasitic capacitance between these wires and signal wires of the display device, causing deterioration in the charging characteristics of the first touch electrode.

Touch sensor integrated type display devices according to second to seventh exemplary embodiments of the present invention described below will solve the problems occurring in the touch sensor integrated type display device according to the first exemplary embodiment.

Figure 4A:
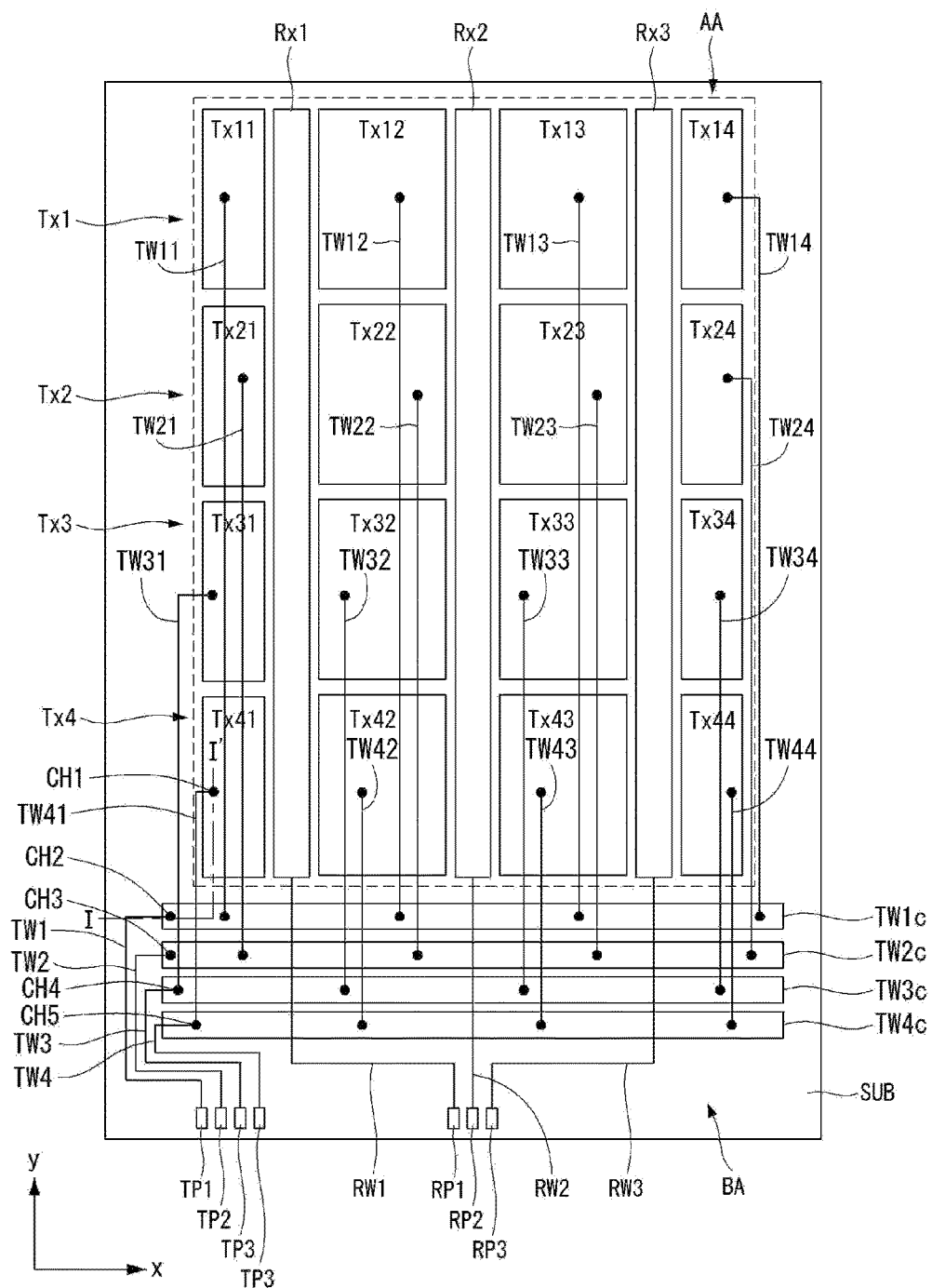
FIG. 4A is a top plan view of a touch sensor integrated type display device according to a second exemplary embodiment of the present invention.
Figure 4B:
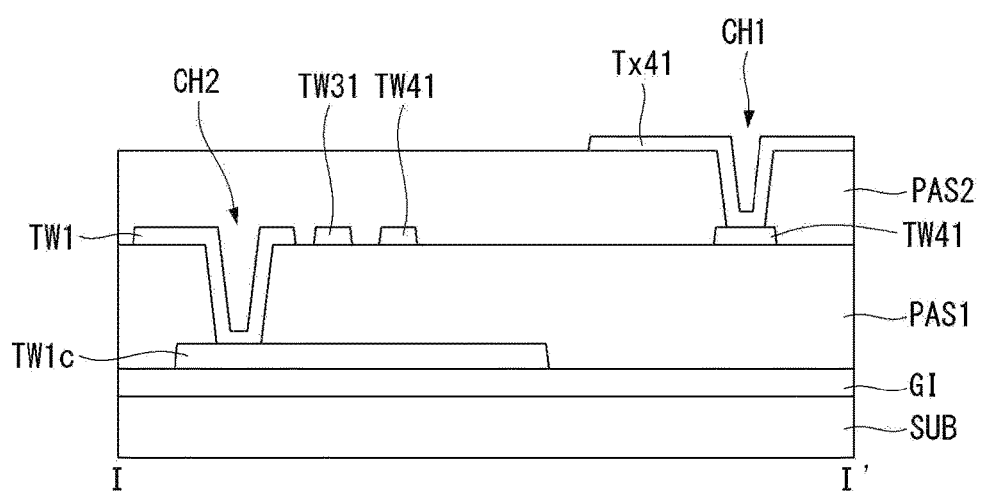
FIG. 4B is a cross-sectional view taken along the line I-I' of FIG. 4A.

The touch sensor integrated type display device according to the second exemplary embodiment of the present invention will be described with reference to FIGS. 4A and 4B. FIG. 4A is a top plan view of a touch sensor integrated type display device according to the second exemplary embodiment of the present invention. FIG. 4B is a cross-sectional view taken along the line I-I' of FIG. 4A.

Referring to FIGS. 4A and 4B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 4A and 4B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW14, TW21 to TW24, TW31 to TW34, and TW41 to TW44 connected to the plurality of first touch electrodes Tx11 to Tx14, Tx21 to Tx24, Tx31 to Tx34, and Tx41 to Tx44, respectively, and extending in the second direction, and a plurality of second touch electrodes Rx1 to Rx3 located between first touch electrodes neighboring in the first direction and arranged in the second direction.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

The first touch electrodes Tx11 to Tx14, Tx21 to Tx24, Tx31 to Tx34, and Tx41 to Tx44 are connected to the first sub routing wires TW11 to TW14, TW21 to TW24, TW31 to TW34, and TW41 to TW44, respectively. The first sub routing wires TW11 to TW13, TW21 to TW23, TW32 to TW34, and TW42 to TW44 within the active area AA are located between the pixel electrodes (not shown) formed on the first passivation layer PAS1.

Some Tx31 and Tx41 of the first touch electrodes Tx11, Tx21, Tx31, and Tx41 in the first column and some Tx14 and Tx24 of the first touch electrodes Tx14, Tx24, Tx34, and Tx44 in the fourth column, which are located in the outermost part, are respectively connected to the first sub routing wires TW31, TW41, TX14, and TW24 formed on the second passivation layer PAS2 in the bezel area BA outside the active area AA. That is, the first sub routing wire TW31 is connected to the first touch electrode Tx31 exposed via a first contact hole CH1 formed in the second passivation layer PAS2, the first sub routing wire TW41 is connected to the first touch electrode Tx41 exposed via a first contact hole CH1 formed in the second passivation layer PAS2, the first sub routing wire TW14 is connected to the first touch electrode Tx14 exposed via a first contact hole CH1 formed in the second passivation layer PAS2, and the first sub routing wire TW24 is connected to the first touch electrode Tx24 exposed via a first contact hole CH1 formed in the second passivation layer PAS2.

The first sub routing wires TW11 to TW14, TW21 to TW24, TW31 to TW34, and TW41 to TW44 are connected together by first connecting wires TW1c to TW4c and first main routing wires TW1 to TW3 formed in the bezel area to constitute a plurality of first touch electrode lines Tx1 to Tx4 arranged in the first direction. The first connecting wires TW1c to TW4c are formed on the same layer as a source/drain electrode layer (not shown) of the thin film transistors and arranged in the first direction (along the x axis). Hereinafter, the embodiment of the present invention will be described taking as an example a gate bottom structure in which the first connecting wires TW1c to TW4c are formed on the gate insulation layer GI covering gate electrodes of the thin film transistors.

The first touch electrode lines Tx1 to Tx4 are configured as follows. The 1-1 touch electrodes Tx11 to Tx14 in the first row arranged in the first direction (along the x axis) are connected to each other by the 1-1 sub routing wires TW11 to TW14 connected to the 1-1h touch electrodes Tx11 to TX14 via first contact holes CH1, the 1-1 connecting wire TW1c formed in the bezel area BA to connect the 1-1 sub routing wires TW11 to TW14, and the 1-1 main routing wire TW1 connected to the 1-1 connecting wire TW1c to constitute the 1-1 touch electrode line Tx1 in the first row. The 1-1 main routing wire TW1 is connected to the 1-1 connecting wire TW1c exposed via the second contact holes CH2 formed in the first passivation layer PAS1, and separated from the 1-1 sub routing wire TW11.

The 1-2 touch electrodes Tx21 to Tx24 in the second row arranged in the first direction (along the x axis) are connected to each other by the 1-2 sub routing wires TW21 to TW24 connected to the 1-2 touch electrodes Tx21 to TX24 via first contact holes CH1, the 1-2 connecting wire TW2c formed in the bezel area BA to connect the 1-2 sub routing wires TW21 to TW24, and the 1-2 main routing wire TW2 connected to the 1-2 connecting wire TW2c to constitute the 1-2 touch electrode line Tx2 in the second row. The 1-2 main routing wire TW2 is connected to the 1-2 connecting wire TW2c exposed via the third contact holes CH3 formed in the first passivation layer PAS1, and separated from the 1-2 sub routing wire TW21.

The 1-3 touch electrodes Tx31 to Tx34 in the third row arranged in the first direction (along the x axis) are connected to each other by the 1-3 sub routing wires TW31 to TW34 connected to the 1-3 touch electrodes Tx21 to TX24 via first contact holes CH1, the 1-3 connecting wire TW3c formed in the bezel area BA to connect the 1-3 sub routing wires TW31 to TW34, and the 1-3 main routing wire TW3 connected to the 1-3 connecting wire TW3c to constitute the 1-3 touch electrode line Tx3 in the third row. The 1-3 main routing wire TW3 is connected to the 1-3 connecting wire TW3c exposed via the fourth contact holes CH4 formed in the first passivation layer PAS1, and extends from the 1-3 sub routing wire TW31.

The 1-4 touch electrodes Tx41 to Tx44 in the fourth row arranged in the first direction (along the x axis) are connected to each other by the 1-4 sub routing wires TW41 to TW44 connected to the 1-4 touch electrodes Tx41 to TX44 via first contact holes CH1, the 1-4 connecting wire TW4c formed in the bezel area BA to connect the 1-4 sub routing wires TW41 to TW44, and the 1-4 main routing wire TW4 connected to the 1-4 connecting wire TW4c to constitute the 1-4 touch electrode line Tx4 in the fourth row. The 1-4 main routing wire TW4 is connected to the 1-4 connecting wire TW4c exposed via the fifth contact holes CH5 formed in the first passivation layer PAS1, and extends from the 1-4 sub routing wire TW41.

The second touch electrodes Rx1 to Rx3 are connected to second routing wires RW1 to RW3 formed in the bezel area BA, respectively, to constitute a plurality of second touch electrode lines.

Specifically, the 2-1 touch electrode Rx1 in the first column is located between the first touch electrodes Tx11, Tx21, Tx31, and Tx41 in the first column and the first touch electrodes Tx12, Tx22, Tx32, and Tx42 in the second column, which neighbor each other in the first direction, and connected to the 2-1 routing wire RW1 to constitute the 2-1 touch electrode line Rx1 in the first column.

The 2-2 touch electrode Rx2 is located between the first touch electrodes Tx12, Tx22, Tx32, and Tx42 in the second column and the first touch electrodes Tx13, Tx23, Tx33, and Tx43 in the third column, which neighbor each other in the first direction, and connected to the 2-2 routing wire RW2 to constitute the 2-2 touch electrode line Rx2 in the second column.

The 2-3 touch electrode Rx3 is located between the first touch electrodes Tx13, Tx23, Tx33, and Tx43 in the third column and the first touch electrodes Tx14, Tx24, Tx34, and Tx44 in the fourth column, which neighbor each other in the first direction, and connected to the 2-3 routing wire RW3 to constitute the 2-3 touch electrode line Rx3 in the third column.

The bezel area BA is located outside the active area AA, and comprises various wires and pads. The wires comprise touch wires TW11 to TW14, TW21 to TW24, TW31 to TW34, TW41 to TW44, TW1c to TW4c, TW1 to TW4; and RW1 to RW3 connected to the first and second touch electrodes Tx11 to Tx14, Tx21 to Tx24, Tx31 to Tx34, Tx41 to Tx44; and Rx1 to Rx3, gate wires (not shown) connected to a gate driving circuit, and data wires (not shown) connected to a data driving circuit. The pads comprise first touch pads TP1 to TP4 connected to the first main routing wires TW1 to TW4 of the first touch wires and second touch pads RP1 to RP3 connected to the second touch wires RW1 to RW3.

Among the touch wires formed in the bezel area BA, the first connecting wires TW1c to TW4c are formed on the gate insulation layer GI, and connected to the first sub routing wires TW11 to TW14, TW21 to TW24, TW31 to TW34, TW41 to TW44, respectively, via the first to fifth contact holes CH2 to CH5 formed in the first passivation layer PAS1. The first main routing wires TW1 to TW4 are formed on the first passivation layer PAS1. The 1-1 and 1-2 main routing wires TW1 and TW2 are separated from the 1-1 and 1-2 sub routing wires TW11 and TW21, respectively, and the 1-3 and 1-4 main routing wires TW3 and TW4 extend from the 1-3 and 1-4 sub routing wires TW31 and TW41, respectively The first and second touch electrodes Tx11 to Tx14, Tx21 to Tx24, Tx31 to Tx34, TX41 to Tx44; and Rx to Rx3 within the active area AA are divided from the common electrodes of the display device. They operate as common electrodes during a display driving operation for displaying data and as touch electrodes during a touch driving operation for recognizing a touch position.

According to the touch sensor integrated display device according to the second exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, touch accuracy can be improved as is the case with the touch sensor integrated type display device according to the first exemplary embodiment.

Moreover, the first touch electrodes not connected on the inner side of the active area AA are all connected by the sub routing wires located in the bezel area BA and constitute all touch channels, thereby making it easy to configure a touch sensor applied to a large-size screen.

Figure 5A:
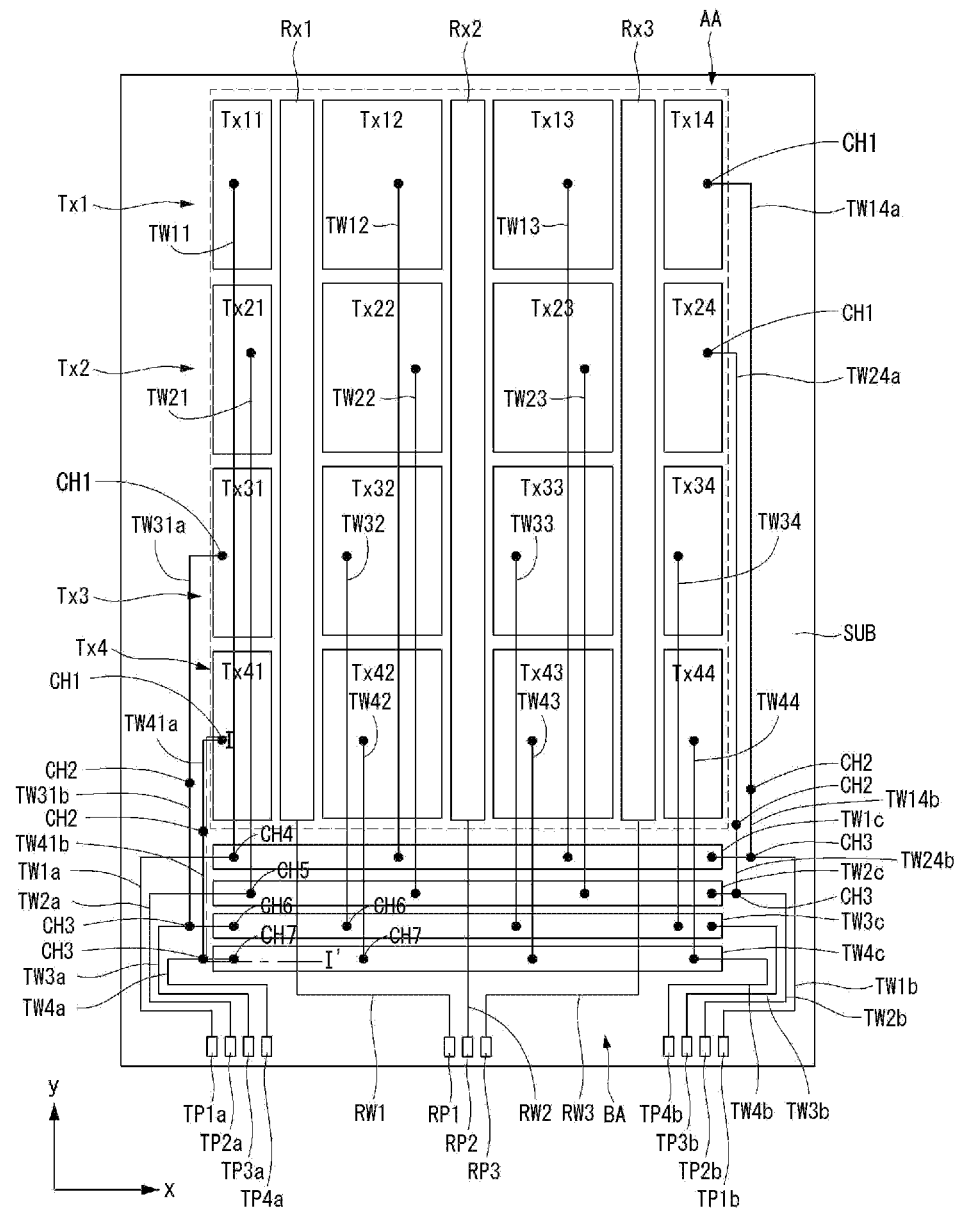
FIG. 5A is a top plan view of a touch sensor integrated type display device according to a third exemplary embodiment of the present invention.
Figure 5B:
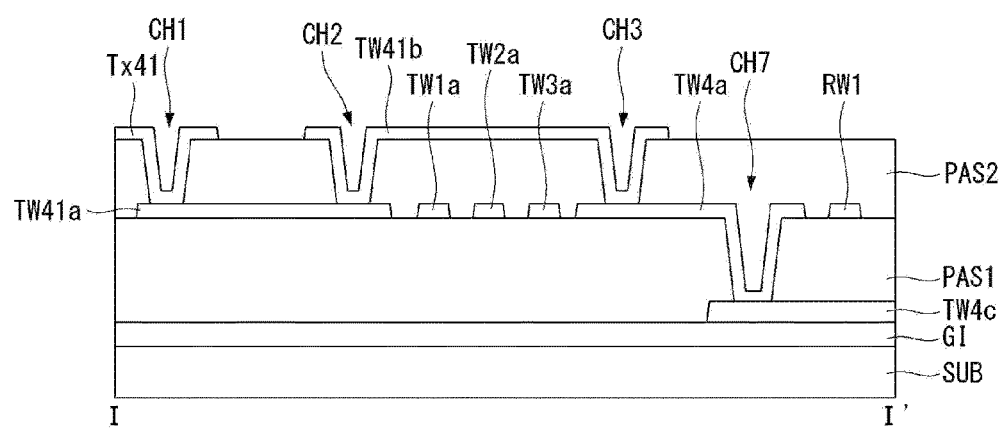
FIG. 5B is a cross-sectional view taken along the line I-I' of FIG. 5A.

Next, the touch sensor integrated type display device according to the third exemplary embodiment of the present invention will be described with reference to FIGS. 5A and 5B. FIG. 5A is a top plan view of a touch sensor integrated type display device according to the third exemplary embodiment of the present invention. FIG. 5B is a cross-sectional view taken along the line I-I' of FIG. 5A.

The configuration of the third exemplary embodiment is substantially similar to the configurations of the first and second exemplary embodiments except that second sub routing wires to be described later are formed on the second passivation layer and connect first sub routing wires and first main routing wires formed on the first passivation layer. Although the third exemplary embodiment is different from the first and second exemplary embodiments in that the first main routing wires and the first touch pads are connected to both ends of a first connecting portion, the main routing wires and the first touch pads in the second exemplary embodiment may be connected to both ends of the first connecting portions, as with the third exemplary embodiment.

Referring to FIGS. 5A and 5B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 5A and 5B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW13, TW21 to TW23, TW32 to TW34, and TW42 to TW44 connected to the plurality of first touch electrodes Tx11 to Tx13, Tx21 to Tx23, Tx32 to Tx34, and Tx42 to Tx44, respectively, and extending in the second direction, and a plurality of second touch electrodes Rx1 to Rx3 located between first touch electrodes neighboring in the first direction and arranged in the second direction.

The bezel area BA is located outside the active area AA, and comprises sub routing wires for grouping the first touch electrodes Tx11 to Tx14, Tx21 to Tx24, Tx31 to Tx34, and Tx41 to Tx44 located in the active area AA, first main routing wires for transmitting and receiving signals for touch driving and touch sensing operations, second routing wires, and first and second routing pads.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

The first touch electrodes Tx11 to Tx14, Tx21 to Tx24, Tx31 to Tx34, and Tx41 to Tx44 are connected to the first sub routing wires TW11 to TW13 and TW14a; TW21 to TW23 and TW24a; TW31a and TW32 to TW34; and TW41a and TW42 to TW44, respectively. The first sub routing wires TW11 to TW13, TW21 to TW23, TW32 to TW34, and TW42 to TW44 within the active area AA are located between the pixel electrodes (not shown) formed on the first passivation layer PAS1.

Some Tx31 and Tx41 of the first touch electrodes Tx11, Tx21, Tx31, and Tx41 in the first column and some Tx14 and Tx24 of the first touch electrodes Tx14, Tx24, Tx34, and Tx44 in the fourth column, which are located in the outermost part, are respectively connected to the first sub routing wires TW31a, TW41a, TX14a, and TW24a formed on the second passivation layer PAS2 in the bezel area BA outside the active area AA. That is, the 1-3 sub routing wire TW31a is connected to the 1-3 touch electrode Tx31 exposed via a first contact hole CH1 formed in the second passivation layer PAS2, the 1-4 sub routing wire TW41a is connected to the 1-4 touch electrode Tx41 exposed via a first contact hole CH1 formed in the second passivation layer PAS2, the 1-1 sub routing wire TW14a is connected to the 1-1 touch electrode Tx14 exposed via a first contact hole CH1 formed in the second passivation layer PAS2, and the 1-2 sub routing wire TW24a is connected to the 1-2 touch electrode Tx24 exposed via a first contact hole CH1 formed in the second passivation layer PAS2.

The first sub routing wires TW31a and TW41a formed on the first passivation layer PAS1 are respectively connected to second sub routing wires TW31b and TW41b formed on the second passivation layer PAS2 via second contact holes CH2 formed in the second passivation layer PAS2. Likewise, the first sub routing wires TW14a and TW24a formed on the first passivation layer PAS1 are respectively connected to second sub routing wires TW14b and TW24b formed on the second passivation layer PAS2 via second contact holes CH2 formed in the second passivation layer PAS2.

The first connection sub routing wires TW31a and TW41a are respectively connected to the first main routing wires TW3a and TW4a formed on the first passivation layer PAS1 via third contact holes CH3. Likewise, the first connection sub routing wires TW14a and TW24a are respectively connected to the first main routing wires TW1b and TW2b formed on the first passivation layer PAS1 via third contact holes CH3 formed in the second passivation layer PAS2.

The first main routing wires are formed on the first passivation layer PAS1, and comprise first main routing wires TW1a to TW4a on the left side and first main routing wires TW1b to TW4b on the right side. The first main routing wires TW1a to TW4a on the left side are connected to first connecting wires TW1b to TW4b via fourth to seventh contact holes CH4 to CH7, respectively, and the first main routing wires TW1b to TW4b on the right side are connected to the first connecting wires TW1c to TW4c via fourth to seventh contact holes CH4 to CH7, respectively.

With this configuration, the 1-1 sub routing wires TW11 to TW13 respectively connected to the 1-1 touch electrodes Tx11 to Tx13 in the first row are connected to the 1-1 connecting wire TW1c, and the 1-1 sub routing wire TW14a connected to the 1-1 touch electrode Tx14 in the first row is connected to the 1-1 connecting wire TW1c by the first connection sub routing wire TW14b and the 1-1 main routing wire TW1b on the right side. As such, the 1-1 touch electrodes Tx11, Tx12, Tx13, and Tx14 in the first row constitute a 1-1 touch electrode line Tx1 arranged in the first direction.

The 1-2 sub routing wires TW21 to TW23 respectively connected to the 1-2 touch electrodes Tx21 to Tx23 in the second row are connected to the 1-2 connecting wire TW2c, and the 1-2 sub routing wire TW24a connected to the 1-2 touch electrode Tx24 in the second row is connected to the 1-2 connecting wire TW2c by the first connection sub routing wire TW24b and the 1-2 main routing wire TW2b on the right side. As such, the 1-2 touch electrodes Tx21, Tx22, Tx23, and Tx24 in the second row constitute a 1-2 touch electrode line Tx2 arranged in the first direction.

The 1-3 sub routing wire TW31a connected to the 1-3 touch electrode Tx31 in the third row is connected to the 1-3 connecting wire TW3c by the first connection sub routing wire TW31b and the 1-3 main routing wire TW3a on the left side, and the 1-3 sub routing wires TW32 to TW34 respectively connected to the 1-3 touch electrodes Tx32 to Tx34 in the third row are connected to the 1-3 connecting wire TW3c. As such, the 1-3 touch electrodes Tx31, Tx32, Tx33, and Tx34 in the third row constitute a 1-3 touch electrode line Tx3 arranged in the first direction.

The 1-4 sub routing wire TW41a connected to the 1-4 touch electrode Tx41 in the fourth row is connected to the 1-4 connecting wire TW4c by the first connection sub routing wire TW41b and the 1-4 main routing wire TW4a on the left side, and the 1-4 sub routing wires TW42 to TW44 respectively connected to the 1-4 touch electrodes Tx42 to Tx44 in the fourth row are connected to the 1-4 connecting wire TW4c. As such, the 1-4 touch electrodes Tx41, Tx42, Tx43, and Tx44 in the fourth row constitute a 1-4 touch electrode line Tx4 arranged in the first direction.

According to the touch sensor integrated display device according to the third exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, touch accuracy can be improved as is the case with the touch sensor integrated type display device according to the first exemplary embodiment.

Moreover, the first touch electrodes not connected on the inner side of the active area AA are all connected by the sub routing wires located in the bezel area BA and constitute all touch channels, thereby making it easy to configure a touch sensor applied to a large-size screen.

Figure 6A:
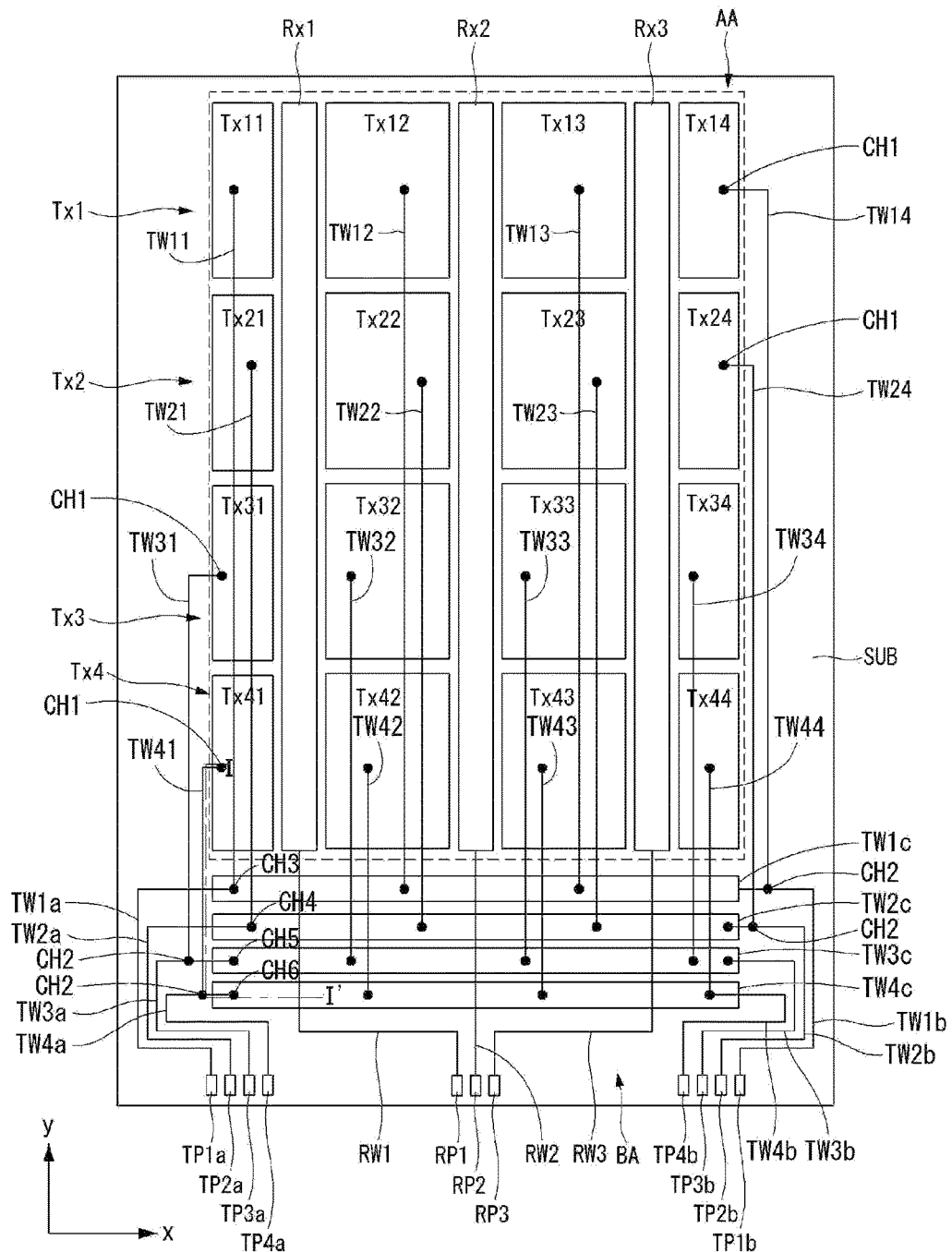
FIG. 6A is a top plan view of a touch sensor integrated type display device according to a fourth exemplary embodiment of the present invention.
Figure 6B:
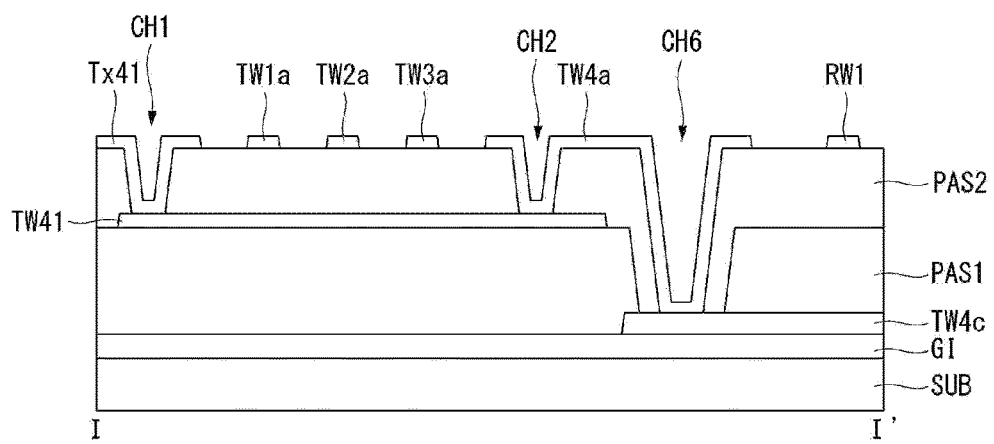
FIG. 6B is a cross-sectional view taken along the line I-I' of FIG. 6A.

Next, the touch sensor integrated type display device according to the fourth exemplary embodiment of the present invention will be described with reference to FIGS. 6A and 6B. FIG. 6A is a top plan view of a touch sensor integrated type display device according to the fourth exemplary embodiment of the present invention. FIG. 6B is a cross-sectional view taken along the line I-I' of FIG. 6A.

The configuration of the fourth exemplary embodiment is substantially similar to the configuration of the second exemplary embodiment except that first main routing wires TW1a to TW4a and TW1b to TW4b to be described later are formed on the second passivation layer PAS2 and first sub routing wires TW14, TW24, TW31, and TW41 located in the bezel area BA outside the active area AA are connected to first connecting wires TW1c, TW2c, TW3c, and TW4c via the first main routing wires TW1b, TW2b, TW3a, and TW4a.

Referring to FIGS. 6A and 6B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 6A and 6B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW13, TW21 to TW23, TW32 to TW34, and TW42 to TW44 connected to the plurality of first touch electrodes Tx11 to Tx13, Tx21 to Tx23, Tx32 to Tx34, and Tx42 to Tx44, respectively, and extending in the second direction, and a plurality of second touch electrodes Rx1 to Rx3 located between first touch electrodes neighboring in the first direction and arranged in the second direction.

The bezel area BA is located outside the active area AA, and comprises sub routing wires for grouping the first touch electrodes Tx11 to Tx14, Tx21 to Tx24, Tx31 to Tx34, and Tx41 to Tx44 located in the active area AA, first main routing wires for transmitting and receiving signals for touch driving and touch sensing operations, second routing wires, and first and second routing pads.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

The first touch electrodes Tx11 to Tx14, Tx21 to Tx24, Tx31 to Tx34, and Tx41 to Tx44 are connected to the first sub routing wires TW11 to TW14; TW21 to TW24; TW31 to TW34; and TW41 to TW44, respectively. The first sub routing wires TW11 to TW13, TW21 to TW23, TW32 to TW34, and TW42 to TW44 within the active area AA are located between the pixel electrodes (not shown) formed on the first passivation layer PAS1.

Some Tx31 and Tx41 of the first touch electrodes Tx11, Tx21, Tx31, and Tx41 in the first column and some Tx14 and Tx24 of the first touch electrodes Tx14, Tx24, Tx34, and Tx44 in the fourth column, which are located in the outermost part, are respectively connected to the first sub routing wires TW31, TW41, TX14, and TW24 formed on the second passivation layer PAS2 in the bezel area BA outside the active area AA. That is, the 1-3 sub routing wire TW31 is connected to the 1-3 touch electrode Tx31 exposed via a first contact hole CH1 formed in the second passivation layer PAS2, the 1-4 sub routing wire TW41 is connected to the 1-4 touch electrode Tx41 exposed via a first contact hole CH1 formed in the second passivation layer PAS2, the 1-1 sub routing wire TW14 is connected to the 1-1 touch electrode Tx14 exposed via a first contact hole CH1 formed in the second passivation layer PAS2, and the 1-2 sub routing wire TW24 is connected to the 1-2 touch electrode Tx24 exposed via a first contact hole CH1 formed in the second passivation layer PAS2.

The first sub routing wires TW31 and TW41 formed on the first passivation layer PAS1 are respectively connected to the first main routing wires TW3a and TW4a on the left side formed on the second passivation layer PAS2 via second contact holes CH2 formed in the second passivation layer PAS2. Likewise, the first sub routing wires TW14 and TW24 formed on the first passivation layer PAS1 are respectively connected to the first main routing wires TW3b and TW4b formed on the second passivation layer PAS2 via second contact holes CH2 formed in the second passivation layer PAS2.

The first main routing wires are formed on the second passivation layer PAS2, and comprise first main routing wires TW1a to TW4a on the left side and first main routing wires TW1b to TW4b on the right side. The first main routing wires TW1a to TW4a on the left side are connected to the left ends of first connecting wires TW1b to TW4b via third to sixth contact holes CH3 to CH6, respectively, and the first main routing wires TW1b to TW4b on the right side are connected to the right ends of first connecting wires TW1c to TW4c via third to sixth contact holes CH3 to CH3, respectively.

With this configuration, the 1-1 sub routing wires TW11 to TW13 respectively connected to the 1-1 touch electrodes Tx11 to Tx13 in the first row are connected to the 1-1 connecting wire TW1c, and the 1-1 sub routing wire TW14 connected to the 1-1 touch electrode Tx14 in the first row is connected to the 1-1 connecting wire TW1c by the 1-1 main routing wire TW1b on the right side. As such, the 1-1 touch electrodes Tx11, Tx12, Tx13, and Tx14 in the first row constitute a 1-1 touch electrode line Tx1 arranged in the first direction.

The 1-2 sub routing wires TW21 to TW23 respectively connected to the 1-2 touch electrodes Tx21 to Tx23 in the second row are connected to the 1-2 connecting wire TW2c, and the 1-2 sub routing wire TW24 connected to the 1-2 touch electrode Tx24 in the second row is connected to the 1-2 connecting wire TW2c by the 1-2 main routing wire TW2b on the right side. As such, the 1-2 touch electrodes Tx21, Tx22, Tx23, and Tx24 in the second row constitute a 1-2 touch electrode line Tx2 arranged in the first direction.

The 1-3 sub routing wire TW31 connected to the 1-3 touch electrode Tx31 in the third row is connected to the 1-3 connecting wire TW3c by the 1-3 main routing wire TW3a on the left side, and the 1-3 sub routing wires TW32 to TW34 respectively connected to the 1-3 touch electrodes TX32 to Tx34 in the third row are connected to the 1-3 connecting wire TW3c. As such, the 1-3 touch electrodes Tx31, Tx32, Tx33, and T34 in the third row constitute a 1-3 touch electrode line Tx3 arranged in the first direction.

The 1-4 sub routing wire TW41 connected to the 1-4 touch electrode Tx41 in the fourth row is connected to the 1-4 connecting wire TW4c by the 1-4 main routing wire TW4a on the left side, and the 1-4 sub routing wires TW42 to TW44 respectively connected to the 1-4 touch electrodes TX42 to Tx44 in the fourth row are connected to the 1-4 connecting wire TW4c. As such, the 1-4 touch electrodes Tx41, Tx42, Tx43, and T44 in the fourth row constitute a 1-4 touch electrode line Tx4 arranged in the first direction.

According to the touch sensor integrated display device according to the fourth exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, touch accuracy can be improved as is the case with the touch sensor integrated type display device according to the first exemplary embodiment.

Moreover, the first touch electrodes not connected on the inner side of the active area AA are all connected by the sub routing wires located in the bezel area BA and constitute all touch channels, thereby making it easy to configure a touch sensor applied to a large-size screen.

Figure 7A:
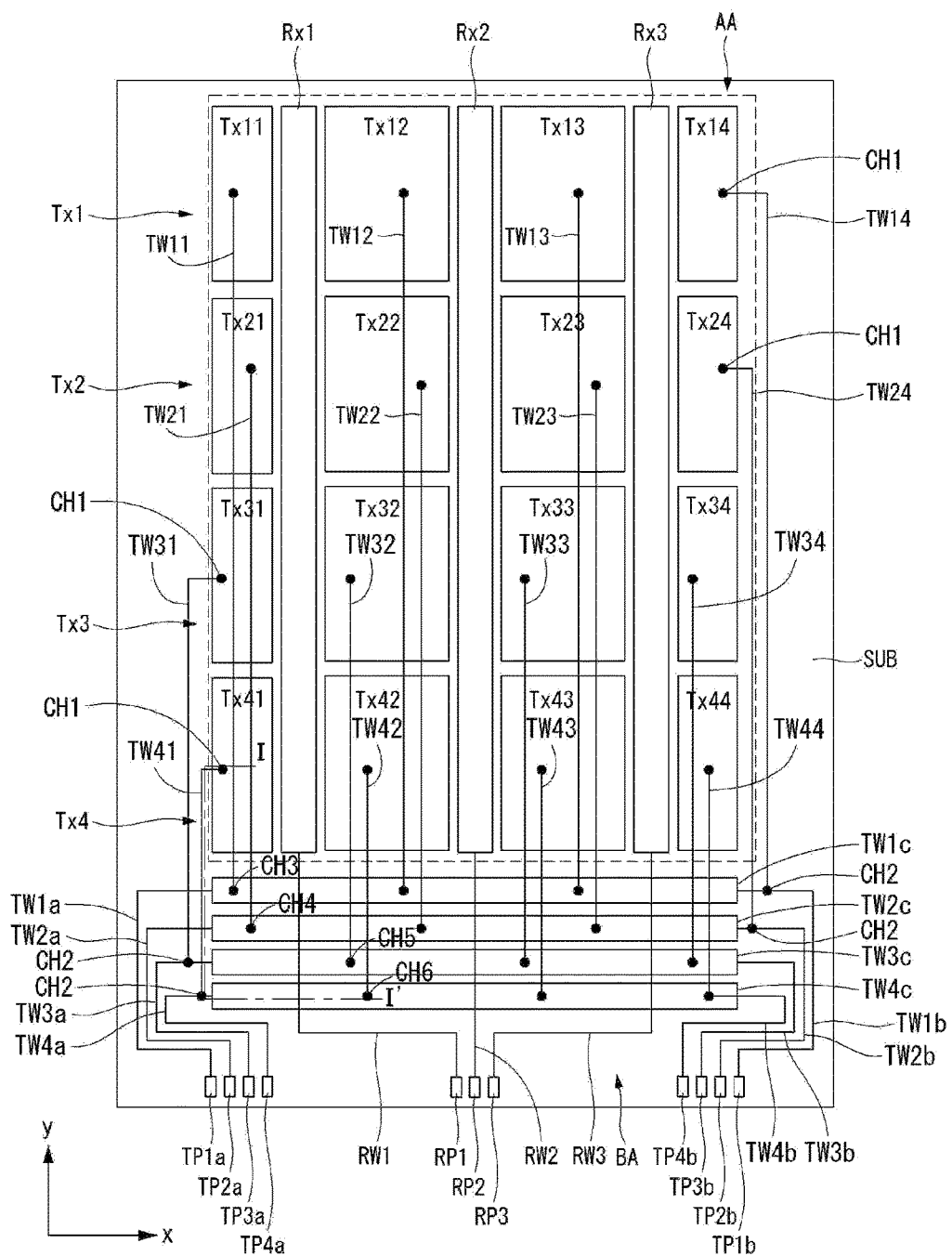
FIG. 7A is a top plan view of a touch sensor integrated type display device according to a fifth exemplary embodiment of the present invention.
Figure 7B:
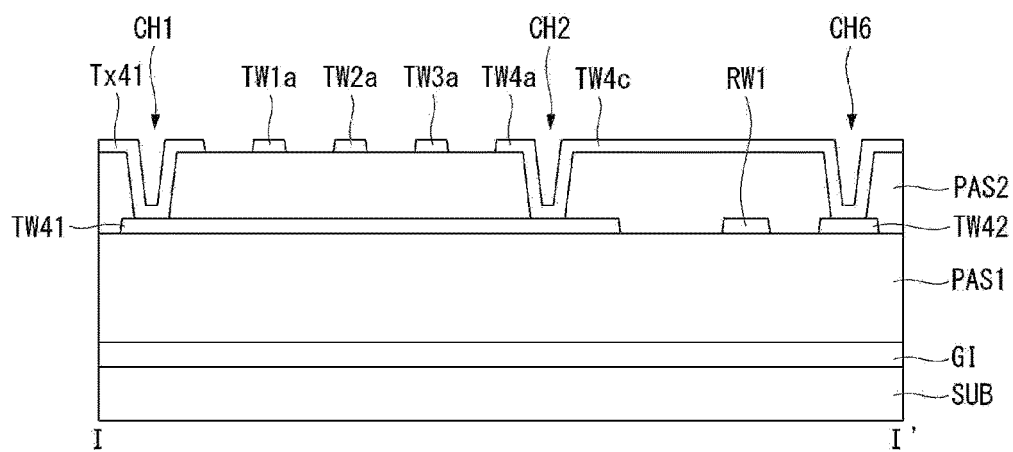
FIG. 7B is a cross-sectional view taken along the line I-I' of FIG. 7A.

Next, the touch sensor integrated type display device according to the fifth exemplary embodiment of the present invention will be described with reference to FIGS. 7A and 7B. FIG. 7A is a top plan view of a touch sensor integrated type display device according to the fifth exemplary embodiment of the present invention. FIG. 7B is a cross-sectional view taken along the line I-I' of FIG. 7A.

The configuration of the fifth exemplary embodiment is substantially similar to the configuration of the fourth exemplary embodiment except that first main routing wires TW1a to TW4a and TW1b to TW4b and first connecting wires TW1c1 to be described later are formed on the second passivation layer PAS2.

Referring to FIGS. 7A and 7B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 7A and 7B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW13, TW21 to TW23, TW32 to TW34, and TW42 to TW44 connected to the plurality of first touch electrodes Tx11 to Tx13, Tx21 to Tx23, Tx32 to Tx34, and Tx42 to Tx44, respectively, and extending in the second direction, and a plurality of second touch electrodes Rx1 to Rx3 located between first touch electrodes neighboring in the first direction and arranged in the second direction.

The bezel area BA is located outside the active area AA, and comprises sub routing wires for grouping the first touch electrodes Tx11 to Tx14, Tx21 to Tx24, Tx31 to Tx34, and Tx41 to Tx44 located in the active area AA, first main routing wires for transmitting and receiving signals for touch driving and touch sensing operations, second routing wires, and first and second routing pads.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

The first touch electrodes Tx11 to Tx14, Tx21 to Tx24, Tx31 to Tx34, and Tx41 to Tx44 are connected to the first sub routing wires TW11 to TW14; TW21 to TW24; TW31 to TW34; and TW41 to TW44, respectively. The first sub routing wires TW11 to TW13, TW21 to TW23, TW32 to TW34, and TW42 to TW44 within the active area AA are located between the pixel electrodes (not shown) formed on the first passivation layer PAS1.

Some Tx31 and Tx41 of the first touch electrodes Tx11, Tx21, Tx31, and Tx41 in the first column and some Tx14 and Tx24 of the first touch electrodes Tx14, Tx24, Tx34, and Tx44 in the fourth column, which are located in the outermost part, are respectively connected to the first sub routing wires TW31, TW41, TX14, and TW24 formed on the second passivation layer PAS2 in the bezel area BA outside the active area AA. That is, the 1-3 sub routing wire TW31 is connected to the 1-3 touch electrode Tx31 exposed via a first contact hole CH1 formed in the second passivation layer PAS2, the 1-4 sub routing wire TW41 is connected to the 1-4 touch electrode Tx41 exposed via a first contact hole CH1 formed in the second passivation layer PAS2, the 1-1 sub routing wire TW14 is connected to the 1-1 touch electrode Tx14 exposed via a first contact hole CH1 formed in the second passivation layer PAS2, and the 1-2 sub routing wire TW24 is connected to the 1-2 touch electrode Tx24 exposed via a first contact hole CH1 formed in the second passivation layer PAS2.

The first sub routing wires TW31 and TW41 formed on the first passivation layer PAS1 are respectively connected to the first main routing wires TW3a and TW4a on the left side formed on the second passivation layer PAS2 via second contact holes CH2 formed in the second passivation layer PAS2. Likewise, the first sub routing wires TW14 and TW24 formed on the first passivation layer PAS1 are respectively connected to the first main routing wires TW1b and TW2b formed on the second passivation layer PAS2 via second contact holes CH2 formed in the second passivation layer PAS2.

The first main routing wires are formed on the second passivation layer PAS2, and comprise first main routing wires TW1a to TW4a on the left side and first main routing wires TW1b to TW4b on the right side. First connecting wires TW1c to TW4c are likewise formed on the second passivation layer PAS2, and respectively connected to the first main routing wires TW1a and TW1b; TW2a and TW2b; TW3a and TW3b; and TW4a and TW4b on the left and right sides.

With this configuration, the 1-1 sub routing wires TW11 to TW13 respectively connected to the 1-1 touch electrodes Tx11 to Tx13 in the first row are connected to the 1-1 connecting wire TW1c via third contact holes CH3, and the 1-1 sub routing wire TW14 connected to the 1-1 touch electrode Tx14 in the first row is connected to the 1-1 main routing wire TW1b on the right side and the 1-1 connecting wire TW1c via a second contact hole CH2. As such, the 1-1 touch electrodes Tx11, Tx12, Tx13, and Tx14 in the first row constitute a 1-1 touch electrode line Tx1 arranged in the first direction.

The 1-2 sub routing wires TW21 to TW23 respectively connected to the 1-2 touch electrodes Tx21 to Tx23 in the second row are connected to the 1-2 connecting wire TW2c via fourth contact holes CH4, and the 1-2 sub routing wire TW24 connected to the 1-2 touch electrode Tx24 in the second row is connected to the 1-2 main routing wire TW2b on the right side and the 1-2 connecting wire TW2c via a second contact hole CH2. As such, the 1-2 touch electrodes Tx21, Tx22, Tx23, and Tx24 in the second row constitute a 1-2 touch electrode line Tx2 arranged in the first direction.

The 1-3 sub routing wire TW31 connected to the 1-3 touch electrode Tx31 in the third row is connected to the 1-3 main routing wire TW3a on the left side and the 1-3 connecting wire TW3c via a second contact hole CH2, and the 1-3 sub routing wires TW32 to TW34 respectively connected to the 1-3 touch electrodes TX32 to Tx34 in the third row are connected to the 1-3 connecting wire TW3c via fifth contact holes CH5. As such, the 1-3 touch electrodes Tx31, Tx32, Tx33, and T34 in the third row constitute a 1-3 touch electrode line Tx3 arranged in the first direction.

The 1-4 sub routing wire TW41 connected to the 1-4 touch electrode Tx41 in the fourth row is connected to the 1-4 main routing wire TW4a on the left side and the 1-4 connecting wire TW4c via a second contact hole CH2, and the 1-4 sub routing wires TW42 to TW44 respectively connected to the 1-4 touch electrodes TX42 to Tx44 in the fourth row are connected to the 1-4 connecting wire TW4c via sixth contact holes CH6. As such, the 1-4 touch electrodes Tx41, Tx42, Tx43, and T44 in the fourth row constitute a 1-4 touch electrode line Tx4 arranged in the first direction.

According to the touch sensor integrated display device according to the fifth exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, touch accuracy can be improved as is the case with the touch sensor integrated type display device according to the first exemplary embodiment.

Moreover, the first touch electrodes not connected on the inner side of the active area AA are all connected by the sub routing wires located in the bezel area BA and constitute all touch channels, thereby making it easy to configure a touch sensor applied to a large-size screen.

Furthermore, the first connecting wires TW1c to TW4c can be spaced apart from signal wires of the display device by the same distance as the thickness of the first and second passivation layers PAS1 and PAS2 because the first connecting wires are formed on the second passivation layer PAS2. Accordingly, touch accuracy can be improved by minimizing interference by the signal wires of the display device.

Figure 8A:
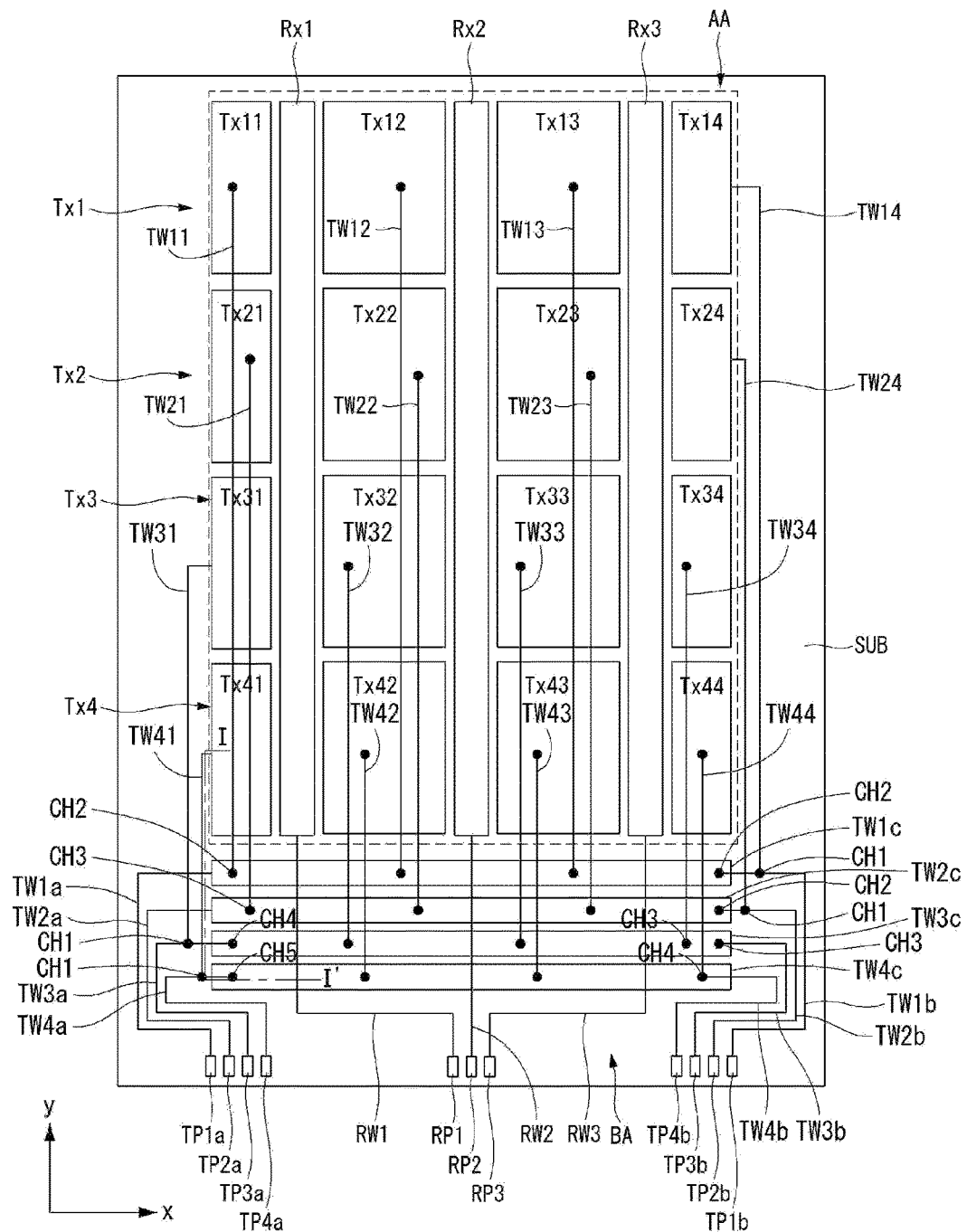
FIG. 8A is a top plan view of a touch sensor integrated type display device according to a sixth exemplary embodiment of the present invention.
Figure 8B:
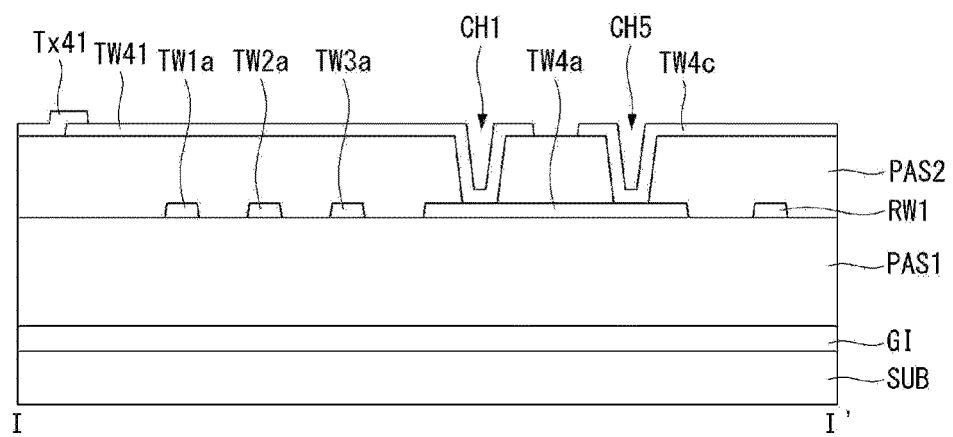
FIG. 8B is a cross-sectional view taken along the line I-I' of FIG. 8A.

Next, the touch sensor integrated type display device according to the sixth exemplary embodiment of the present invention will be described with reference to FIGS. 8A and 8B. FIG. 8A is a top plan view of a touch sensor integrated type display device according to the sixth exemplary embodiment of the present invention. FIG. 8B is a cross-sectional view taken along the line I-I' of FIG. 8A.

The configuration of the sixth exemplary embodiment is substantially similar to the configuration of the second exemplary embodiment except that some TW14, TW24, TW31, and TW41 of first sub routing wires and first connecting wires TW1c to TW4c to be described later are formed on the second passivation layer PAS2.

Referring to FIGS. 8A and 8B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 8A and 8B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW13, TW21 to TW23, TW32 to TW34, and TW42 to TW44 connected to the plurality of first touch electrodes Tx11 to Tx13, Tx21 to Tx23, Tx32 to Tx34, and Tx42 to Tx44, respectively, and extending in the second direction, and a plurality of second touch electrodes Rx1 to Rx3 located between first touch electrodes neighboring in the first direction and arranged in the second direction.

The bezel area BA is located outside the active area AA, and comprises sub routing wires for grouping the first touch electrodes Tx11 to Tx14, Tx21 to Tx24, Tx31 to Tx34, and Tx41 to Tx44 located in the active area AA, first main routing wires for transmitting and receiving signals for touch driving and touch sensing operations, second routing wires, and first and second routing pads.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

The first touch electrodes Tx11 to Tx14, Tx21 to Tx24, Tx31 to Tx34, and Tx41 to Tx44 are connected to the first sub routing wires TW11 to TW14; TW21 to TW24; TW31 to TW34; and TW41 to TW44, respectively. The first sub routing wires TW11 to TW13, TW21 to TW23, TW32 to TW34, and TW42 to TW44 within the active area AA are located between the pixel electrodes (not shown) formed on the first passivation layer PAS1.

Some Tx31 and Tx41 of the first touch electrodes Tx11, Tx21, Tx31, and Tx41 in the first column and some Tx14 and Tx24 of the first touch electrodes Tx14, Tx24, Tx34, and Tx44 in the fourth column, which are located in the outermost part, are respectively connected to the first sub routing wires TW31, TW41, TX14, and TW24 formed on the second passivation layer PAS2 in the bezel area BA outside the active area AA. That is, the 1-1 touch electrode Tx14 is formed to cover an end of the 1-1 sub routing wire TW14 formed on the second passivation layer PAS2 and connected to the 1-1 sub routing wire TW14, the 1-2 touch electrode Tx24 is formed to cover an end of the 1-2 sub routing wire TW24 formed on the second passivation layer PAS2 and connected to the 1-2 sub routing wire TW24, the 1-3 touch electrode Tx31 is formed to cover an end of the 1-3 sub routing wire TW31 formed on the second passivation layer PAS2 and connected to the 1-3 sub routing wire TW31, and the 1-4 touch electrode Tx41 is formed to cover an end of the 1-4 sub routing wire TW41 formed on the second passivation layer PAS2 and connected to the 1-4 sub routing wire TW41.

The first sub routing wires TW14 and TW24 formed on the second passivation layer PAS2 are respectively connected to the first main routing wires TW1b and TW2b on the right side formed on the first passivation layer PAS1 via first contact holes CH1 formed in the second passivation layer PAS2. Likewise, the first sub routing wires TW31 and TW41 formed on the second passivation layer PAS2 are respectively connected to the first main routing wires TW3a and TW4a on the left side formed on the first passivation layer PAS1 via first contact holes CH1 formed in the second passivation layer PAS2.

The first main routing wires are formed on the first passivation layer PAS1, and comprise first main routing wires TW1a to TW4a on the left side and first main routing wires TW1b to TW4b on the right side. First connecting wires TW1c to TW4c are formed on the second passivation layer PAS2. The first main routing wire TW1a on the left side and first main routing wire TW1b on the right side are connected to either end of a 1-1 connecting wire TW1c via second contact holes CH2, the first main routing wire TW2a on the left side and first main routing wire TW2b on the right side are connected to either end of a 1-2 connecting wire TW2c via third contact holes CH3, the first main routing wire TW3a on the left side and first main routing wire TW3b on the right side are connected to either end of a 1-3 connecting wire TW3c via fourth contact holes CH4, and the first main routing wire TW4a on the left side and first main routing wire TW4b on the right side are connected to either end of a 1-4 connecting wire TW4c via fifth contact holes CH5.

With this configuration, the 1-1 sub routing wires TW11 to TW13 respectively connected to the 1-1 touch electrodes Tx11 to Tx13 in the first row are connected to the 1-1 connecting wire TW1c via second contact holes CH2, and the 1-1 sub routing wire TW14 connected to the 1-1 touch electrode Tx14 in the first row is connected to the 1-1 main routing wire TW1b on the right side and the 1-1 connecting wire TW1c via a first contact hole CH1. As such, the 1-1 touch electrodes Tx11, Tx12, Tx13, and Tx14 in the first row constitute a 1-1 touch electrode line Tx1 arranged in the first direction.

The 1-2 sub routing wires TW21 to TW23 respectively connected to the 1-2 touch electrodes Tx21 to Tx23 in the second row are connected to the 1-2 connecting wire TW2c via third contact holes CH3, and the 1-2 sub routing wire TW24 connected to the 1-2 touch electrode Tx24 in the second row is connected to the 1-2 main routing wire TW2b on the right side and the 1-2 connecting wire TW2c via a first contact hole CH1. As such, the 1-2 touch electrodes Tx21, Tx22, Tx23, and Tx24 in the second row constitute a 1-2 touch electrode line Tx2 arranged in the first direction.

The 1-3 sub routing wire TW31 connected to the 1-3 touch electrode Tx31 in the third row is connected to the 1-3 main routing wire TW3a on the left side and the 1-3 connecting wire TW3c via a first contact hole CH1, and the 1-3 sub routing wires TW32 to TW34 respectively connected to the 1-3 touch electrodes TX32 to Tx34 in the third row are connected to the 1-3 connecting wire TW3c via fourth contact holes CH4. As such, the 1-3 touch electrodes Tx31, Tx32, Tx33, and T34 in the third row constitute a 1-3 touch electrode line Tx3 arranged in the first direction.

The 1-4 sub routing wire TW41 connected to the 1-4 touch electrode Tx41 in the fourth row is connected to the 1-4 main routing wire TW4a on the left side and the 1-4 connecting wire TW4c via a first contact hole CH1, and the 1-4 sub routing wires TW42 to TW44 respectively connected to the 1-4 touch electrodes TX42 to Tx44 in the fourth row are connected to the 1-4 connecting wire TW4c via fifth contact holes CH5. As such, the 1-4 touch electrodes Tx41, Tx42, Tx43, and T44 in the fourth row constitute a 1-4 touch electrode line Tx4 arranged in the first direction.

According to the touch sensor integrated display device according to the sixth exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, touch accuracy can be improved as is the case with the touch sensor integrated type display device according to the first exemplary embodiment.

Moreover, the first touch electrodes not connected on the inner side of the active area AA are all connected by the sub routing wires located in the bezel area BA and constitute all touch channels, thereby making it easy to configure a touch sensor applied to a large-size screen.

Figure 9A:
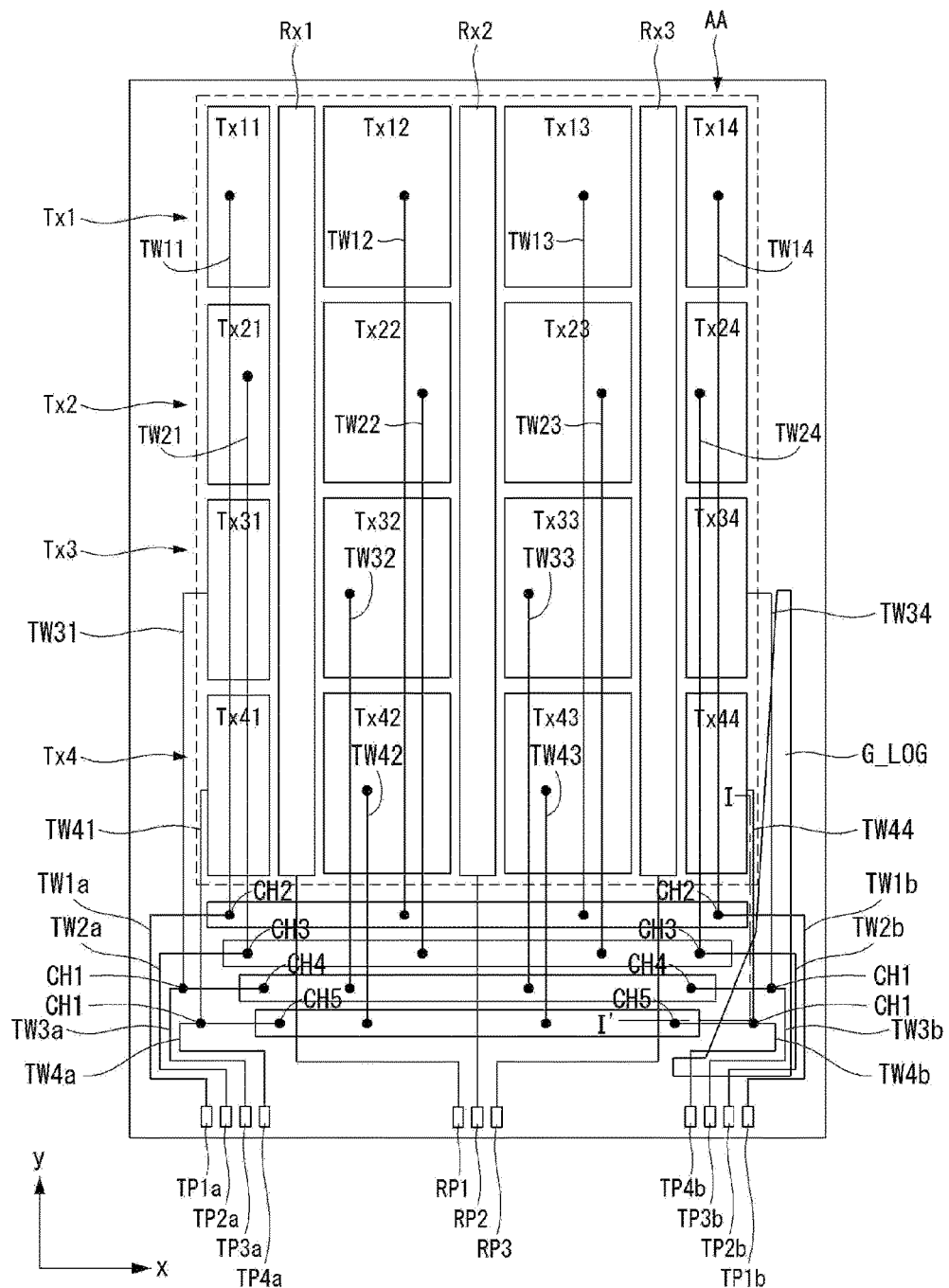
FIG. 9A is a top plan view of a touch sensor integrated type display device according to a seventh exemplary embodiment of the present invention.
Figure 9B:
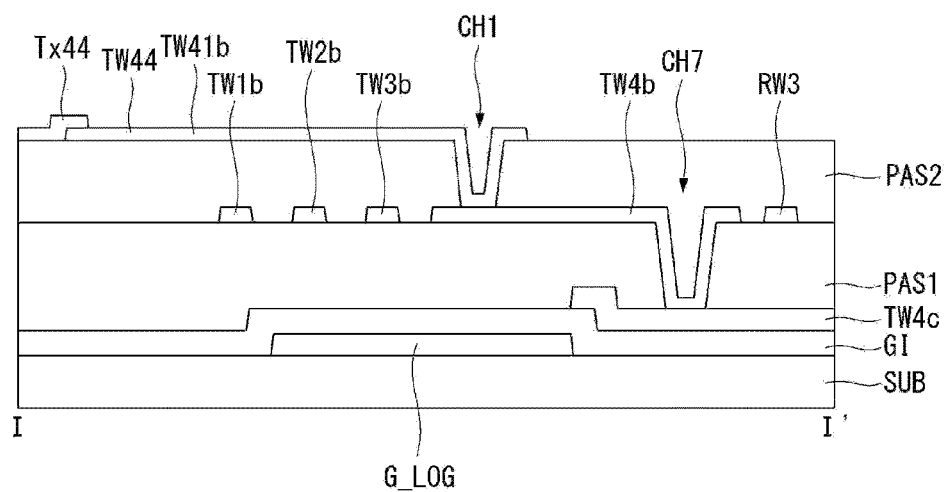
FIG. 9B is a cross-sectional view taken along the line I-I' of FIG. 9A.

Next, the touch sensor integrated type display device according to the seventh exemplary embodiment of the present invention will be described with reference to FIGS. 9A and 9B. FIG. 9A is a top plan view of a touch sensor integrated type display device according to the seventh exemplary embodiment of the present invention. FIG. 9B is a cross-sectional view taken along the line I-I' of FIG. 9A.

The configuration of the seventh exemplary embodiment is substantially similar to the configuration of the sixth exemplary embodiment except that first connecting wires to be described later are formed on the gate insulation layer and are different in size.

Referring to FIGS. 9A and 9B, the touch sensor integrated type display device comprises an active area AA where touch electrodes are formed and data is displayed and a bezel area AA which is located outside the active area AA and where wires and pads connecting touch electrodes to constitute touch electrode lines are formed. The pixel electrodes and wires of the display device are omitted in FIGS. 9A and 9B for simplicity of the drawings and convenience of explanation.

The active area AA comprises a plurality of first touch electrodes Tx11 to Tx14, Tx21 to Tx24, Tx31 to Tx34, and Tx41 to Tx44 divided in a first direction (e.g., along the x axis) and a second direction (e.g., along the y axis) which cross each other, a plurality of first sub routing wires TW11 to TW13, TW21 to TW23, TW32 to TW34, and TW42 to TW44 connected to the plurality of first touch electrodes Tx11 to Tx13, Tx21 to Tx23, Tx32 to Tx34, and Tx42 to Tx44, respectively, and extending in the second direction, and a plurality of second touch electrodes Rx1 to Rx3 located between first touch electrodes neighboring in the first direction and arranged in the second direction.

The bezel area BA is located outside the active area AA, and comprises sub routing wires for grouping the first touch electrodes Tx11 to Tx14, Tx21 to Tx24, Tx31 to Tx34, and Tx41 to Tx44 located in the active area AA, first main routing wires for transmitting and receiving signals for touch driving and touch sensing operations, second routing wires, and first and second routing pads.

If the pixel electrodes (not shown) of the display device are formed on a first passivation layer PAS1 for covering and planarizing the thin film transistors, the plurality of first touch electrodes Tx11 to Tx14, Tx21 to Tx24, Tx31 to Tx34, and Tx41 to Tx44 and second touch electrodes Rx1 to Rx3 also serving as common electrodes are formed on a second passivation layer PAS2 covering the pixel electrodes, and at least partially overlap the pixel electrodes. Alternatively, the first touch electrodes Tx11 to Tx14, Tx21 to Tx24, Tx31 to Tx34, and Tx41 to Tx44 and the second touch electrodes Rx1 to Rx3 may be formed on the first passivation layer PAS1, and the pixel electrodes may be formed on the second passivation layer PAS2. The following embodiment of the present invention will be described taking an example where the first and second touch electrodes Tx11 to Tx14, Tx21 to Tx24, Tx31 to Tx34, Tx41 to Tx44; and Rx1 to Rx3 are formed on the second passivation layer PAS2.

The first touch electrodes Tx11, Tx21, Tx31, Tx41; and Tx14, Tx24, Tx34, Tx44 in the first and fourth columns located on either edge of the active area AA are smaller in size, about half the size, compared to the first touch electrodes Tx12, Tx12, TX32, Tx42; and Tx13, Tx23, Tx33, Tx43 in the second and third columns formed on the inner side of the active area.

Some Tx31 and Tx41 of the first touch electrodes Tx11, Tx21, Tx31, and Tx41 in the first column and some Tx34 and Tx44 of the first touch electrodes Tx14, Tx24, Tx34, and Tx44 in the fourth column, which are located in the outermost part, are respectively connected to the first sub routing wires TW31, TW41, TX34, and TW44 formed on the second passivation layer PAS2 in the bezel area BA outside the active area AA.

That is, the 1-3th touch electrode Tx31 is formed to cover an end of the 1-3 sub routing wire TW31 formed on the second passivation layer PAS2 and connected to the 1-3 sub routing wire TW31, the 1-4 touch electrode Tx41 is formed to cover an end of the 1-4 sub routing wire TW41 formed on the second passivation layer PAS2 and connected to the 1-4 sub routing wire TW41, the 1-3 touch electrode Tx34 is formed to cover an end of the 1-3 sub routing wire TW34 formed on the second passivation layer PAS2 and connected to the 1-3 sub routing wire TW34, and the 1-4 touch electrode Tx44 is formed to cover an end of the 1-4 sub routing wire TW44 formed on the second passivation layer PAS2 and connected to the 1-4 sub routing wire TW44.

The first sub routing wires TW31 and TW41 formed on the second passivation layer PAS2 are respectively connected to the first main routing wires TW3$a$ and TW4$a$ on the left side formed on the first passivation layer PAS1 via first contact holes CH1 formed in the second passivation layer PAS2. Likewise, the first sub routing wires TW34 and TW44 formed on the second passivation layer PAS2 are respectively connected to the first main routing wires TW3$b$ and TW4$b$ on the right side formed on the first passivation layer PAS1 via first contact holes CH1 formed in the second passivation layer PAS2.

The first main routing wires are formed on the first passivation layer PAS1, and comprise first main routing wires TW1$a$ to TW4$a$ on the left side and first main routing wires TW1$b$ to TW4$b$ on the right side. First connecting wires TW1$c$ to TW4$c$ are formed on the gate insulation layer GI. The first main routing wire TW1$a$ on the left side and first main routing wire TW1$b$ on the right side are connected to either end of a 1-1 connecting wire TW1$c$ via second contact holes CH2, the first main routing wire TW2$a$ on the left side and first main routing wire TW2$b$ on the right side are connected to either end of a 1-2 connecting wire TW2$c$ via third contact holes CH3, the first main routing wire TW3$a$ on the left side and first main routing wire TW3$b$ on the right side are connected to either end of a 1-3 connecting wire TW3$c$ via fourth contact holes CH4, and the first main routing wire TW4$a$ on the left side and first main routing wire TW4$b$ on the right side are connected to either end of a 1-4 connecting wire TW4$c$ via fifth contact holes CH5.

The first connecting wires TW1$c$ to TW4$c$ are formed on the gate insulation layer GI in a way that they do not overlap a gate LOG wire G_LOG formed on the substrate SUB, and a virtual line connecting end portions of the first connecting wires TW1$c$ to TW4$c$ on the side closer to the gate LOG wire G_LOG slants. By forming the gate LOG wire G_LOG in a way that they do not overlap the first connecting wires TW1$c$ to TW4$c$, the gate LOG wire G_LOG can be formed in a double layer of a gate metal layer and a source/drain metal layer. This reduces the resistance of the gate LOG wire G_LOG, and therefore prevents touch performance degradation caused by noise increase, as well as improving display performance.

With this configuration, the 1-1 sub routing wires TW11 to TW14 respectively connected to the 1-1 touch electrodes Tx11 to Tx14 in the first row are connected to the 1-1 connecting wire TW1$c$ via second contact holes CH2. As such, the 1-1 touch electrodes Tx11, Tx12, Tx13, and Tx14 in the first row constitute a 1-1 touch electrode line Tx1 arranged in the first direction.

The 1-2 sub routing wires TW21 to TW24 respectively connected to the 1-2 touch electrodes Tx21 to Tx24 in the second row are connected to the 1-2 connecting wire TW2$c$ via third contact holes CH3. As such, the 1-2 touch electrodes Tx21, Tx22, Tx23, and Tx24 in the second row constitute a 1-2 touch electrode line Tx2 arranged in the first direction.

The 1-3 sub routing wire TW31 connected to the 1-3 touch electrode Tx31 in the third row is connected to the 1-3 main routing wire TW3$a$ on the left side and the 1-3 connecting wire TW3$c$ via a first contact hole CH1, the 1-3 sub routing wires TW32 and TW33 respectively connected to the 1-3 touch electrodes TX32 and Tx33 in the third row are connected to the 1-3 connecting wire TW3$c$ via fourth contact holes CH4, and the 1-3 sub routing wire TW34 connected to the 1-3 touch electrode Tx34 in the third row is connected to the 1-3 main routing wire TW3$b$ on the right side and the 1-3 connecting wire TW3$c$ via a first contact hole CH1. As such, the 1-3 touch electrodes Tx31, Tx32, Tx33, and T34 in the third row constitute a 1-3 touch electrode line Tx3 arranged in the first direction.

The 1-4 sub routing wire TW41 connected to the 1-4 touch electrode Tx41 in the fourth row is connected to the 1-4 main routing wire TW4$a$ on the left side and the 1-4 connecting wire TW4$c$ via a first contact hole CH1, the 1-4 sub routing wires TW42 and TW43 respectively connected to the 1-4 touch electrodes TX42 and Tx43 in the fourth row are connected to the 1-4 connecting wire TW4$c$ via fifth contact holes CH5, and the 1-4 sub routing wire TW54 connected to the 1-4 touch electrode Tx44 in the fourth row is connected to the 1-4 main routing wire TW4$b$ on the right side and the 1-4 connecting wire TW4$c$ via a first contact hole CH1. As such, the 1-4 touch electrodes Tx41, Tx42, Tx43, and T44 in the fourth row constitute a 1-4 touch electrode line Tx4 arranged in the first direction.

According to the touch sensor integrated display device according to the seventh exemplary embodiment of the present invention, the first touch electrodes Tx11, Tx21, Tx31, Tx41; and Tx14, TX24, Tx34, Tx44 positioned on either end of the active area AA are smaller in size, about half the size, compared to the first touch electrodes Tx12, Tx22, Tx32, Tx42; and Tx13, Tx23, Tx33, Tx43 positioned on the inner side of the active area AA. Accordingly, touch accuracy can be improved as is the case with the touch sensor integrated type display device according to the first exemplary embodiment.

Moreover, the first touch electrodes not connected on the inner side of the active area AA are all connected by the sub routing wires located in the bezel area BA and constitute all touch channels, thereby making it easy to configure a touch sensor applied to a large-size screen.

In addition, the gate LOG wire G_LOG can be formed in a double layer of a gate metal layer and a source/drain metal layer because the first connecting wires TW1$c$ to TW4$c$ do not overlap the gate LOG wire G_LOG. This reduces the resistance of the gate LOG wire G_LOG, and therefore prevents touch performance degradation caused by noise increase, as well as improving display performance.

It will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device with an active area and a bezel area located outside the active area, the touch sensor integrated type display device comprising:
    a plurality of first touch electrodes located in the active area and divided in first and second directions crossing each other;
    a plurality of second touch electrodes located in the active area, divided in the first direction, and alternating with the first touch electrodes arranged in the first direction; and
    a plurality of first sub routing wires each connected to respective ones of the plurality of first touch electrodes, and arranged side by side in the second direction,
    wherein first outermost touch electrodes located in outermost both sides of the active area in the first direction, among the first touch electrodes arranged in the second direction, are smaller in size than another first touch electrodes,
    wherein the first sub routing wires comprises:
        a 1-1 sub routing wire located in the active area, one end of which is connected to a respective one of the first touch electrodes located within the outermost both sides of the active area in the first direction; and
        a 1-2 sub routing wire located in the bezel area, one end of which is connected to a respective one of the first touch electrodes located in one of the outermost both sides of the active area in the first direction,
    wherein the display device further comprises a first connecting wire that connects the first sub routing wires respectively connected to the first touch electrodes in one line arranged in the first direction, a first main routing wire that connects the 1-2 sub routing wire to the first connecting wire, and a gate LOG (line on glass) wire spaced apart from the first connecting wire, and
    wherein the first connecting wire is formed on a gate insulation layer, a first passivation layer covers the first connecting wire, the 1-1 sub routing wire and the first main routing wire are formed on the first passivation layer, a second passivation layer covers the 1-1 sub routing wire and the first main routing wire, the 1-2 sub routing wire is connected to the first main routing wire via a contact hole formed in the second passivation layer, and the first main routing wire is connected to a first connecting portion formed on the gate insulation layer via a contact hole formed in the first passivation layer.

2. The touch sensor integrated type display device of claim 1, wherein first touch electrodes in one line arranged in the first direction, among the plurality of first touch electrodes, is connected to a first connecting wire that connects the first sub routing wires respectively connected to the first touch electrodes in the one line, and the first connecting wire is located in the bezel area.

3. The touch sensor integrated type display device of claim 1, wherein the gate LOG wire comprises:
    a first metal layer disposed on the gate insulation layer; and
    a second metal layer formed on the first passivation layer that covers the first metal layer,
    wherein the second metal layer is connected to the first metal layer via a contact hole formed in the first passivation layer.

* * * * *